US005710815A

United States Patent [19]

Ming et al.

[11] Patent Number: 5,710,815
[45] Date of Patent: Jan. 20, 1998

[54] ENCODER APPARATUS AND DECODER APPARATUS FOR A TELEVISION SIGNAL HAVING EMBEDDED VIEWER ACCESS CONTROL DATA

[75] Inventors: Fong Ming; Ngai-Ming Tsang, both of New Territories, Hong Kong

[73] Assignee: Vtech Communications, Ltd., Tai Po, Hong Kong

[21] Appl. No.: 477,659

[22] Filed: Jun. 7, 1995

[51] Int. Cl.⁶ .................................................. H04K 1/00
[52] U.S. Cl. ........................................... 380/20; 380/23
[58] Field of Search ........................... 380/23, 20; 455/2, 455/4.1, 4.2; 340/825.31, 825.34; 348/1, 6, 10

[56] References Cited

U.S. PATENT DOCUMENTS

| | | | |
|---|---|---|---|
| 3,730,980 | 5/1973 | Kirk, Jr. | 178/5.1 |
| 3,733,431 | 5/1973 | Kirk, Jr. et al. | 178/5.1 |
| 4,112,464 | 9/1978 | Guif et al. | 358/122 |
| 4,313,132 | 1/1982 | Doles et al. | 358/114 |
| 4,323,922 | 4/1982 | den Toonder et al. | 358/117 |
| 4,336,553 | 6/1982 | den Toonder et al. | 358/120 |
| 4,353,088 | 10/1982 | den Toonder et al. | 358/120 |
| 4,424,532 | 1/1984 | den Toonder et al. | 358/120 |
| 4,425,579 | 1/1984 | Merrell | 358/86 |
| 4,531,020 | 7/1985 | Wechselberger et al. | 178/22.08 |
| 4,531,021 | 7/1985 | Bluestein et al. | 178/22.08 |
| 4,533,948 | 8/1985 | McNamara et al. | 358/122 |
| 4,558,464 | 12/1985 | O'Brien, Jr. | 455/4 |
| 4,562,465 | 12/1985 | Glaab | 358/120 |
| 4,621,285 | 11/1986 | Schilling et al. | 358/120 |
| 4,633,309 | 12/1986 | Li et al. | 358/122 |
| 4,688,247 | 8/1987 | Davidov | 380/19 |
| 4,709,266 | 11/1987 | Hanas et al. | 380/20 |
| 4,841,569 | 6/1989 | Wachob | 380/7 |
| 4,926,477 | 5/1990 | Paik | 380/15 |
| 4,930,158 | 5/1990 | Vogel | 380/5 |
| 4,930,160 | 5/1990 | Vogel | 380/23 |
| 5,020,129 | 5/1991 | Martin et al. | 455/4 |
| 5,046,093 | 9/1991 | Wachob | 380/20 |
| 5,321,748 | 6/1994 | Zeidler et al. | 380/14 |
| 5,371,795 | 12/1994 | Vogel | 380/23 |

*Primary Examiner*—Mark Hellner
*Attorney, Agent, or Firm*—Dick and Harris

[57] ABSTRACT

An encoding apparatus and an associated decoding apparatus for a television signal having embedded viewer access control data. A program category code is inserted into a television signal by the encoding apparatus, identifying at least one attribute of program content of an associated television program. An individual viewer may preclude receipt of television programming identified by a corresponding program category code as containing a program content attribute for which the individual viewer has chosen to preclude viewing. The decoding apparatus compares the program category code embedded within a television program with a user category code indicating at least one of the attributes of programming content for which the individual user has elected to preclude receipt of television programming. Viewing of the television signal is precluded when the television signal includes a program category code corresponding to the user category code.

30 Claims, 15 Drawing Sheets

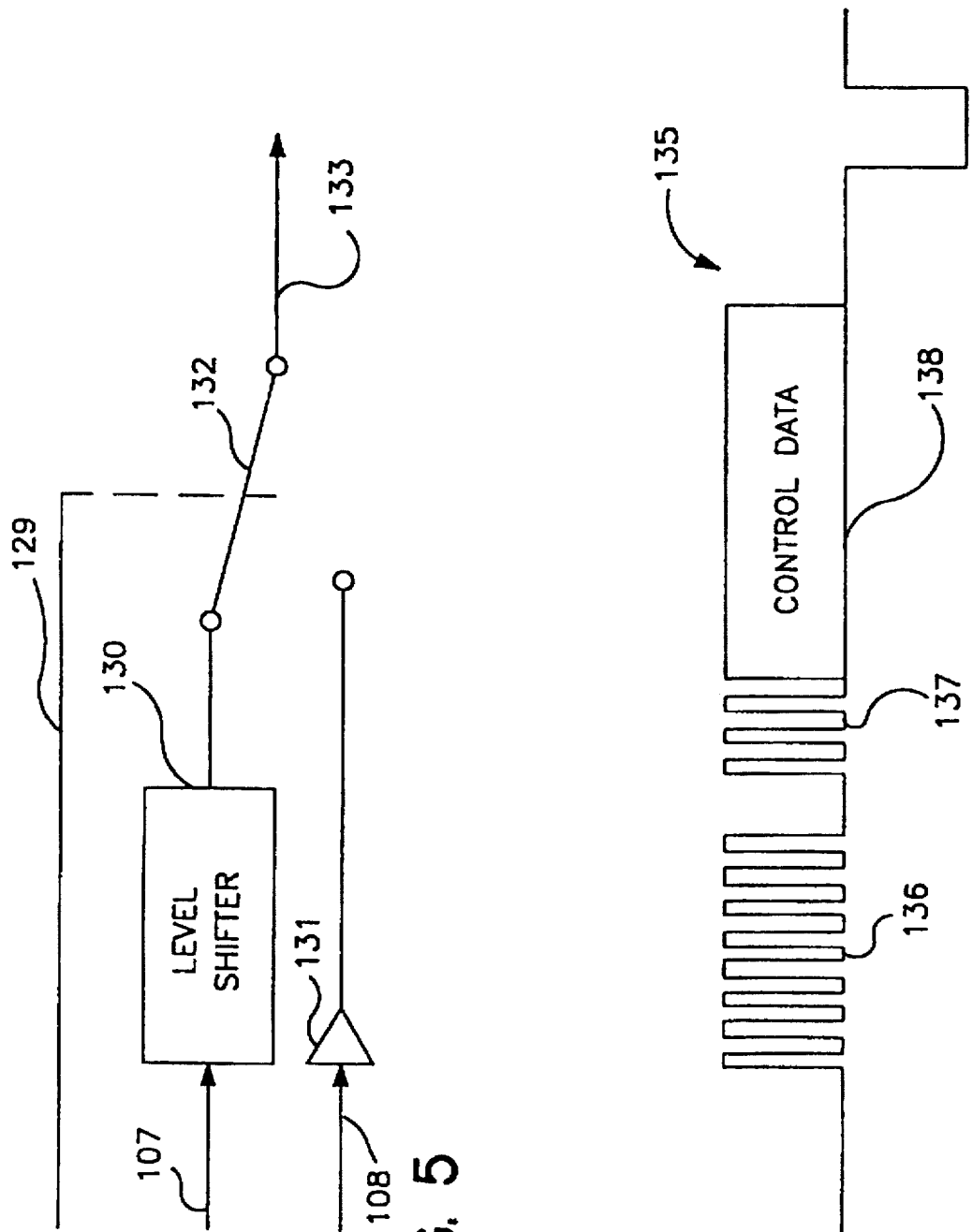

| STATUS | | PROGRAM TYPE |
|---|---|---|
| 0 | 0 | PPV PROGRAM |
| 0 | 1 | PROMOTIONAL PROGRAM |
| 1 | 0 | FREE POWER ON PROGRAM |
| 1 | 1 | FREE PROGRAM |

| | P1 | P2 | P3 | P4 | P5 | P6 | P7 | P8 | P9 |
|---|---|---|---|---|---|---|---|---|---|
| 170 — TV PROGRAM | | | | | | | | | |
| 171 — PROGRAM PPV CODE | 01 | 03 | 12 | 02 | 22 | 08 | 30 | 41 | 27 |
| 172 — USER PPV CODE 1 | 00 | 00 | 12 | 02 | 02 | 02 | 02 | 02 | 02 |
| 173 — USER PPV CODE 2 | 00 | 12 | 02 | 22 | 22 | 22 | 22 | 22 | 22 |
| 174 — AUTHORIZATION | off | off | on | on | on | off | off | off | off |

| Address | Data | |
|---|---|---|
| $b_{16}$ | $b_8$ $b_7$ | $b_0$ |
| ... | ... | ... |
| 0h | VIDEO SEED | |
| 1h | PROGRAM PPV CODE | |
| 2h | AGC LINE | |
| 3h | KEYCARD OUTPUT | |
| 4h | PROGRAM CLASS CODE ($b_7$–$b_0$) | |
| 5h | PROGRAM CLASS CODE ($b_{15}$–$b_8$) | |
| 6h | PROGRAM CLASS CODE ($b_{23}$–$b_{16}$) | |
| 7h | PROGRAM CLASS CODE ($b_{31}$–$b_{24}$) | |
| 8h | CHANNEL NUMBER | |
| 9h | PROGRAM CATEGORY CODE | |
| Ah | YEAR | |
| Bh | MONTH | |
| Ch | WEEK | |
| Dh | DAY | |
| Eh | HOUR | |
| Fh | MINUTE | |
| 10h–FFh | ON-SCREEN MESSAGE | |
| 100h–17Fh | PRESET CHANNEL TABLE | |
| 180h–18Fh | KEY CARD INPUT | |
| 190h–19Fh | EXTENDED PROGRAM LEVEL CODES | |

FIG. 8

| 152 | Program Category | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | a | b | c | d | e | f |
| 153 User Preset Max. Level | 3 | 2 | 1 | 7 | 8 | 9 | 9 | a | a | b | c | 8 | 7 | 6 | 5 | 4 |
| 154 Current Program Level | 0 | 2 | 1 | 0 | 5 | 3 | a | 6 | 3 | 2 | a | 3 | 4 | 6 | 8 | 0 |
| 155 Permit | 1 | 1 | 1 | 1 | 1 | 1 | 0 | 1 | 1 | 1 | 1 | 1 | 1 | 1 | 0 | 1 |

FIG. 11

| 152 | Program Category | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | a | b | c | d | e | f |
| 153 User Preset Max. Level | 3 | 2 | 1 | 7 | 8 | 9 | a | a | a | b | c | 8 | 7 | 6 | 8 | 4 |
| 154 Current Program Level | 0 | 2 | 1 | 0 | 5 | 3 | 9 | 6 | 3 | 2 | a | 3 | 4 | 6 | 5 | 0 |
| 155 Permit | 1 | 1 | 1 | 1 | 1 | 1 | 1 | 1 | 1 | 1 | 1 | 1 | 1 | 1 | 1 | 1 |

FIG. 12

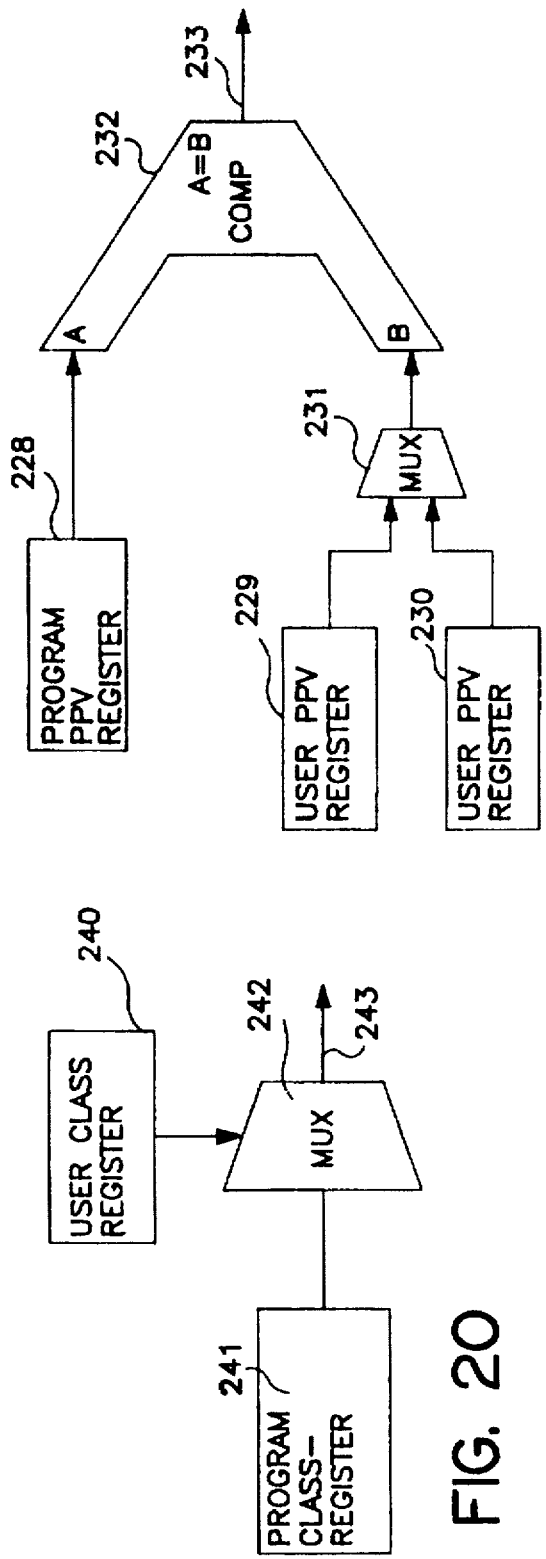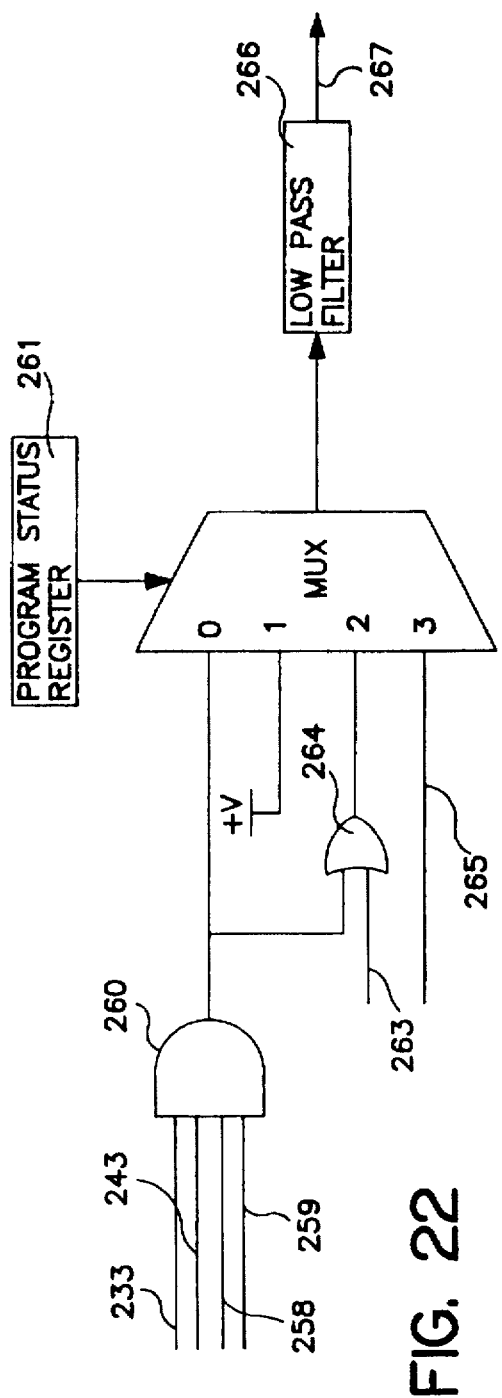

ENCODER APPARATUS AND DECODER APPARATUS FOR A TELEVISION SIGNAL HAVING EMBEDDED VIEWER ACCESS CONTROL DATA

BACKGROUND OF THE INVENTION

The present invention relates in general to cable television systems, and, more particularly, to controlling each cable subscriber's access to television programming broadcast over a cable network.

Cable television has become a popular and widespread means of broadcasting television programming. A cable network carries programming from a cable television service provider to each cable television subscriber. Typically, a single coaxial cable is routed to each subscriber's residence. Numerous television channels, carrying a variety of news, sports, movies, educational programs, and other programming, are transmitted simultaneously to each user's residence via the coaxial cable connected to the common cable network.

Often, it is desirable to restrict a subscriber's access to a portion of the television programming which is broadcast to all of the subscribers. For example, cable television service providers typically provide a basic package of available channels to all subscribers, who pay a general access fee. Moreover, such cable television service providers typically provide premium channels, such as sports and movie channels, to those subscribers willing to pay an additional fee in order to receive these premium channels. The cable television service provider will accordingly employ means for precluding viewing of these premium channels by those subscriber households which have not paid the additional premium fee.

In addition to premium television channels, it is also sometimes desirable for a cable television service provider to charge an additional fee for the viewing of a single television program on a one-time basis, such as a music concert, boxing match, or sporting event. Accordingly, prior art cable television systems often provide some means for prohibiting viewing of a particular program by those households which have not paid an additional fee to view the particular program.

Recently, increased attention has been drawn to the content of television programming. Parents are frequently concerned with the exposure of their children to violence, profanity, and nudity contained within television programs viewed within the home. Accordingly, there is a need among cable television service providers to provide the capability for individual subscribers, upon their own initiative, to preclude viewing within their home of certain television programs or portions of certain television programs, having attributes of programming content, which the parents wish to preclude viewing by their children.

Additionally, constraints may be placed upon a cable television service provider as to whether a particular household can receive a particular television program. For example, in some countries, a governmental body may conceivably require that certain programs not be received by subscribers who are members of a particular religion, members of a particular political party, or who have or do not have a particular occupation.

Accordingly, it is an object of the present invention to provide an apparatus for enabling individual subscribers to a cable television system to preclude the viewing of particular television programs, based upon an attribute of the program content of the television program.

It is another object of the present invention to enable a cable television service provider to restrict subscriber access to cable television programming, based upon whether a particular subscriber is a member of a particular, predetermined class of users.

These and other objects and features of the present invention will become apparent in light of the present specification, claims and drawings.

SUMMARY OF THE INVENTION

The present invention comprises an apparatus for embedding viewer access control data within a television signal. The television signal includes a sequence of television programs. Means are provided for generating a program category code identifying at least one attribute of program content of an associated television program. Means are also provided for inserting the program category code into the television signal. An individual viewer may preclude receipt of television programming identified by a corresponding program category code as containing a program content attribute for which the individual viewer has chosen to preclude viewing.

In the preferred embodiment, at least one of the attributes comprises an attribute of a potentially offensive nature. The attribute of a potentially offensive nature is preferably selected from the group consisting of violence, nudity and profanity. Moreover, in the preferred embodiment, each program category code identifies a plurality of attributes of program content of an associated television program.

Also, in the preferred embodiment, means are provided for generating at least one extended program category code identifying a level of an attribute of program content within an associated television program. The level is variable over a predetermined range of potential values. Means are further provided for inserting the extended program category code into the television signal. An individual viewer may preclude receipt of television programming identified by a corresponding extended program category code as containing a level of a program content attribute which is greater in magnitude than a threshold level for the attribute previously established by the individual viewer.

Moreover, in the preferred embodiment, means are provided for generating a user identification code identifying a corresponding single viewer. Means are further provided for generating a user class code associating an individual viewer identified by the user identification code with at least one of a plurality of predetermined classes of viewers. Each of the classes of viewers preferably comprises a plurality of individual viewers.

Means are further provided for generating a program class code identifying particular classes of users authorized to view an associated television program. Additional means are provided for inserting each of the user identification code, user class code, and program class code into the television signal. A viewer identified by the user identification code is authorized to view a particular television program only when the particular television program contains a program class code which corresponds to the user class code.

In the preferred embodiment, at least one of the plurality of predetermined classes of viewers is selected from the group consisting of occupation, political party affiliation, and religion.

The present invention also comprises an apparatus for receiving a television signal containing the embedded viewer access control data, and for outputting the television signal to a video display. Means are provided for extracting the program category code from the television signal. Means are also provided for storing a user category code. The user category code indicates at least one attribute of program content for which an individual user has elected to preclude receipt of television programming. Means are further provided for comparing the program category code and the user category code. In addition, means are provided for precluding output of a television signal to the video display when the television signal includes a program category code corresponding to the user category code.

In the preferred embodiment, means are provided for extracting the extended program category code from the television signal. Means are additionally provided for establishing an extended user category code which is indicative of a threshold level of an associated attribute of program content. The individual viewer may elect to preclude viewing of television programming having a level of program content of the associated attribute greater in magnitude than the established threshold level. Means are provided for comparing the extended program category code and the extended user category code. Means are further provided for precluding output of the television signal to the video display when the extended program category code corresponding to the associated television program is greater in magnitude than the extended user category code.

Also, in the preferred embodiment, the embedded viewer access control data further includes a user identification code identifying a corresponding, single viewer, and a user class code associating the individual viewer with at least one of a plurality of predetermined classes of viewers. First storing means are provided for storing a unique viewer address code uniquely identifying the apparatus. Means are provided for extracting the user identification code, user class code, and program class code from the television signal. First comparing means are provided for comparing the unique viewer address code and the user identification code. Second storing means are provided for storing the user class code when the unique viewer address code is equal to the user identification code. Moreover, second comparing means are provided for comparing the program class code and the stored user class code. Means are further provided for precluding output of the television signal to the video display when the television signal includes a television program containing a program class code which does not correspond to the stored user class code.

The present invention also comprises an apparatus for embedding viewer access control data within a television signal, wherein the apparatus is capable of alternatively addressing both a single receiving unit and a predetermined plurality of receiving units for receipt of the access control data. Means are provided for generating a user identification code uniquely identifying a single receiving unit. Means are further provided for generating a block address code identifying a predetermined subset of receiving units. Means are additionally provided for generating a block enable flag indicating whether the addressing is in one of a single user addressing mode and a block user addressing mode. Moreover, means are provided for inserting the user identification code, block address code, and block enable flag into the television signal. Accordingly, a single receiving unit is addressed when the block enable flag is indicative of a single user addressing mode. Moreover, a predetermined plurality of receiving units are addressed when the block enable flag is indicative of the block user addressing mode.

The present invention also comprises a method for synchronizing a first pseudo-random number generator within a transmitting unit and a second pseudo-random number generator within a receiving unit. Both of the first and second pseudo-random number generators are used in conjunction with a data set. The data set is logically divided into frames and frame sets of size N frames. The method comprises the steps of: (a) generating an initial seed value within the transmitting unit; (b) storing the initial seed value in a first current seed register within the transmitting unit, where the first current seed register has a first current seed value; (c) generating a next seed value within the transmitting unit; (d) clearing a first frame counter within the transmitting unit, where the first frame counter has a first frame count value; (e) loading the first current seed value and the first frame count value into the first pseudo-random number generator; (f) operating the pseudo-random number generator using the initial seed value and the first frame count value as a combined seed; (g) transmitting the next seed value and the first frame count value from the transmitting unit to the receiving unit; (h) incrementing the first frame counter; (i) repeating steps e through h when the first frame count value of the first frame counter is not equal to N; (j) storing the next seed value in the current seed register and repeating steps c through h when the first frame count value of the first frame counter is equal to N; (k) receiving the next seed value and the first frame count value within the receiving unit; (l) incrementing a second frame counter within the receiving unit at a beginning of a video frame; (m) testing whether the next seed value and the first frame count value received by the receiving unit are erroneous; (n) loading the next seed value into a next seed register within the receiving unit when the received next seed value is not erroneous; (o) loading the first frame count value into the second frame counter within the receiving unit when the received first frame count value is not erroneous, where the second frame counter has a second frame count value; (p) loading a second current seed value from a second current seed register in the receiving unit and the second frame count value into the second pseudo-random number generator; (q) operating the second pseudo-random number generator using the second current seed value and the second frame count values as a combined seed; (r) clearing the frame counter and loading the second current seed register with a value output from the second next seed register when the second frame counter is equal to N; and (s) repeating steps k through r.

BRIEF DESCRIPTION OF THE DRAWINGS

FIG. 5 of the drawings is a schematic diagram of a portion of the video encoder;

FIG. 6 of the drawings is a timing diagram showing the access control data inserted into a horizontal scan line of a video frame;

FIG. 8 of the drawings is a diagram of the global data portion of the access control data;

FIG. 11 of the drawings is an example of the extended program category authorization, in which an example subscriber is precluded from viewing the associated television programming;

FIG. 12 of the drawings is another example of the extended program category authorization, in which an example subscriber is authorized to view the associated television programming;

FIG. 19 of the drawings is a logic diagram of the pay-per-view authorization process;

FIG. 20 of the drawings is a logic diagram of the class authorization process;

FIG. 22 of the drawings is a logic diagram of the final authorization process;

DETAILED DESCRIPTION OF THE DRAWINGS

Figure 1:
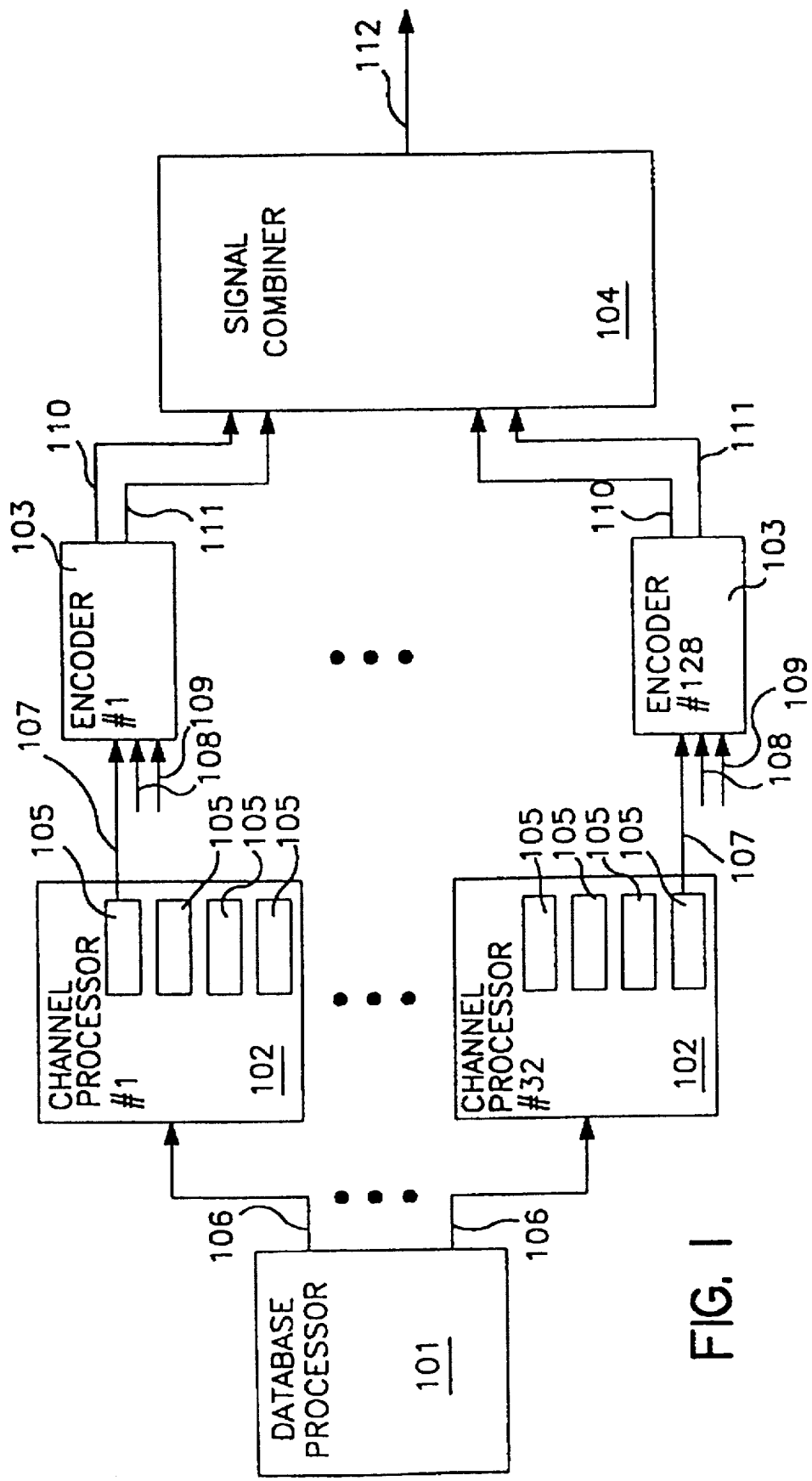
FIG. 1 of the drawings is a schematic diagram of the encoder apparatus.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

The present invention includes a system having both an encoding apparatus and a plurality of decoding apparatuses for a Community Antenna Television (CATV), or cable television system. The encoding apparatus typically resides within the facilities of a cable television service provider. The decoding apparatuses typically reside within the homes of the individual viewers, or subscribers, to the CATV system. A cable network, typically constructed of coaxial cable, couples each subscriber's decoding apparatus to the cable television service provider's encoding apparatus. Up to 128 scrambled television channels may be transmitted simultaneously over the cable network.

The present system employs several differentiated layers, or levels, for authorizing, or controlling, each individual subscriber's access to television programming. Five distinct types of subscriber access control to programming are supported by the present system: (1) pay-per-view (PPV) access authorization; (2) classification authorization; (3) basic category authorization; (4) extended category authorization; and (5) keycard authorization.

Access control data, supporting all five types of authorization, are embedded, in digital format, into unused portions of video signals by the CATV service provider's encoder apparatus. Each of the 128 supported CATV television channels comprises a television signal including a sequence of television programs. Each television program is in turn constructed of a sequence of still video images, or video frames, presented to a viewer in rapid procession via a video display, so as to create the appearance of full motion video.

Each video frame is itself constructed from a sequence of horizontal scan lines. The majority of horizontal scan lines contain video information, displayable as pixels on corresponding horizontal lines of the subscriber's television set or video monitor. A subset of the horizontal scan lines, however, are not displayable, but rather correspond to the vertical blanking interval portion of the video frame; i.e., a time during the video frame in which the video display's electron gun is turned off and repositioned to the upper region of the display, in preparation for displaying the next video frame. During this vertical blanking interval portion of each video frame, the CATV service provider's encoder apparatus inserts access codes for each of the five types of subscriber access authorization.

For pay-per-view television programming, subscribers wishing to view the program must make prior arrangements to view the pay-per-view programs on a one-time basis with the CATV service provider, typically by paying an additional fee. Moreover, a subscriber may elect to receive premium television channels, in which each program broadcast on the premium channel is essentially a recurring pay-per-view program. The access control data within the video frames of each pay-per-view program includes a program pay-per-view code, inserted by the CATV service provider and uniquely identifying the associated television program. Prior to airing a particular pay-per-view program, each subscriber who arranged to view the program will be authorized to receive the program. A user pay-per-view code, together with a user address, or user identification code, will be inserted into the access control data of television programming aired prior to the particular pay-per-view program. Each subscriber's decoder apparatus contains a unique, prestored user address, stored within non-volatile memory. Whenever the decoder apparatus determines that its prestored user address is equal to the user identification code contained within the received access control data, the decoder apparatus will store the associated user pay-per-view code in an internal user PPV code register. Moreover, whenever a user pay-per-view code previously stored within a decoder apparatus is equal to the program pay-per-view code embedded within a particular program's access control data, the subscriber's decoder apparatus will be deemed to be authorized to receive the pay-per-view program.

For classification authorization, each subscriber is identified as being a member of one of a plurality of predetermined classes of subscribers. In the preferred embodiment, up to 32 separate classes are supported. Individual subscribers may, for example, be designated as being a member of a particular class based upon their occupation, political party affiliation, or religion. Class authorization allows the CATV service provider to either permit a particular subscriber to view a program, or preclude the subscriber from viewing the same program, based upon the class in which the particular subscriber has been previously deemed to be a member.

One potential application for class authorization is the implementation of viewer access restrictions which may be imposed upon the CATV service provider by a governmental body. For example, a particular national or regional government may permit local broadcasting of a particular television program over the CATV network, but only if subscribers who are not a member of a particular political party are prohibited from viewing the program.

To implement class authorization, each subscriber must first be assigned membership in one of the 32 potential user classes. A user class code, having a numeric value indicative of an individual subscriber's assigned class, is inserted into the access control data, along with the same subscriber's user address, or user identification code, by the CATV service provider. Whenever a subscriber's decoder apparatus determines that its prestored user address corresponds to the user address received in the access control data, the decoder apparatus will store the accompanying user class code into an internal user class code register.

The video frames of each television program include a program class code, identifying which of the one or more classes of users are authorized to view the associated television program. Whenever a user class code stored within a decoder apparatus corresponds to the program class code embedded within a particular program's access control data, the subscriber's decoder apparatus will be deemed to be authorized to receive the present program.

Basic category authorization enables a subscriber, upon his or her own initiative, to preclude viewing of television programming, based upon whether the programming contains content having any of a plurality of predefined attributes. For example, a television program may be categorized by whether or not the program contains content of a potentially offensive nature, such as violence, nudity, profanity, etc. A subscriber who wishes to preclude viewing of programming having one or more such attributes may contact the CATV service provider, requesting that any television programming containing such attributes be precluded from being displayed on a video display via the subscriber's decoder apparatus. In response, the CATV service provider will periodically insert a user category code, having a numeric value indicative of the particular programming content attributes for which viewing by the particular subscriber is to be precluded, into the access control data, along with the same subscriber's user address, or user identification code. Whenever a subscriber's decoder apparatus determines that its prestored user address corresponds to the user address received in the access control data, the decoder apparatus will store the accompanying user category code into an internal user category code register.

The video frames of each television program includes a program category code indicative of whether the corresponding television program has been deemed to contain content within any of the predefined attributes. Typically, a "censor", such as an employee of the CATV service provider, will review each television program prior to its initial airing, in order to determine the attributes of its programming content, and, in turn, the proper corresponding program category code. For example, it may be determined that a particular television program contains both violence and profanity. If so, the program's embedded access control data will contain a program category code indicative of both of these attributes. Whenever a user category code previously stored within a decoder apparatus corresponds to the program category code embedded within a particular program's access control data, the decoder apparatus will preclude viewing of the associated television program.

The CATV service provider may choose to categorize each television program, as a whole, as containing any of the predetermined content attributes. For example, if an individual television program contains at least one instance of violence, the service provider may use the program category code to identify the associated program, in its entirety, as containing violent content. A consistently-valued program category code will accordingly be periodically embedded into the access control information throughout the program's broadcast.

Alternatively, the CATV service provider may choose to categorize each television program with more time-based granularity, using several, differently-valued program categorization codes throughout the program's duration. Program category codes may be inserted into the access control data on a highly frequent basis, as often as every fourth consecutive video frame. Accordingly, the most recent program category code can be changed in less than one second. Moreover, changes in the value of the program category code may be synchronized in time with changes of programming content attributes within a single television program. A "censor", when viewing a program, may record the start and stop times of each instance of each program content attribute.

For example, a particular program may be deemed to contain an instance of violent content at time t+10:12, wherein "t" denotes the time at which the program's airing begins, "10" denotes the number of minutes into the program at which the violent content commences, and "12" denotes the number of additional seconds into the program at which the violent content commences. The violent content may continue, for example, for one minute and five seconds, until time t+11:17. Afterwards, the same program may contain an instance of nudity, from time t+15:07 until time t+16:51. Corresponding program category codes may be inserted into the access control data as follows: program category codes indicative of an absence of any particular attributes from time t+0:00 until time 10:10; program category codes indicative of the violent program content attribute from times t+10:11 to t+11:18; program category codes again indicative of an absence of any particular attributes from time t+11:19 until time t+15:05; program category codes indicative of nudity program content from times t+15:06 to time t+16:52; with program category codes thereafter again indicative of an absence of any particular attributes.

In this manner, any subscribers who have previously expressed a desire to preclude the viewing of violent programming, and who are viewing the program of the above-identified example, would be able to view the majority of the program. During time t+10:11 until t+11:18, however, the subscriber's decoder apparatus will not output the violent programming to the attached video display. Instead, a substantially blank screen will be displayed, along with a brief textual explanation as to why viewing is presently precluded. In this manner, a viewer is not precluded from viewing the entirety of a particular program, merely because a portion of the program contains content having an attribute for which the subscriber has previously expressed a desire not to receive programming.

For extended category authorization, (as opposed to basic category authorization), television programs are categorized not only by whether they contain content having any of a plurality of predefined attributes, but are further categorized as to the particular level of each attribute that the program contains. The level assigned to a particular program for a given attribute is variable over a predetermined range of potential values, from a minimum value, indicative of no content for the given attribute, to a maximum value, indicative of an extensive amount of content for the given attribute. The particular value assigned to a program attribute category, again typically performed by a "censor" at the CATV service provider, may be either qualitative or quantitative in nature. For example, if one of the predefined program categories corresponds to violent programming content, a program assigned a relatively high level of violence rating may be so assigned because the particular program contains either a relatively large number of instances of violence (quantitative), or because the program contains relatively few violent episodes, but at least one of these episodes is relatively extreme or graphic (qualitative).

The present encoding apparatus supports at least sixteen discrete categories for extended program categorization. The video frames of each television program are embedded with a plurality of extended program categorization code. Each program categorization code corresponds to a predetermined attribute of the associated television programming content, such as violence, nudity, or profanity. The value of any particular extended program categorization code corresponds to the level of the associated attribute contained within the current television program into which the codes are inserted, as determined by the CATV service provider. As explained above with respect to basic program categorization codes, the CATV service provider may choose to categorize each television program, as a whole, when establishing the particular levels of each extended category for a given television program. Alternatively, the CATV service provider may choose to categorize each television program with more time-based granularity, varying the level assigned to each extended program categorization code over time, in synchronization with changes in the level of programming content for each associated, predetermined attribute.

For each of the 16 supported extended program categories, each individual subscriber may program his or her decoder apparatus with a maximum level which the user deems acceptable for personal viewing. For example, several of the program categories may be predefined to correspond to attributes of television programming which many subscribers may find personally offensive, such as profanity. A particular user with young children may choose to establish a relatively low threshold level for this category, precluding viewing of all programs or portions of programs containing any profanity whatsoever. A user with teenage children, however, may choose a more moderate threshold level for this category, permitting a small quantity or degree of profanity, while still precluding viewing of more extreme levels of adult language.

For each of the sixteen extended program categories, the present decoder apparatus contains a corresponding extended user category register, storing the threshold, maximum value established by the subscriber for the associated program category attribute. Each of the sixteen extended user category registers is loaded with a threshold value assigned by the user, via conventional on-screen programming techniques. Individual subscribers may use their handheld remote control unit to access an on-screen menu, generated by the decoder apparatus in response to a request entered from the remote controller. For each program category, the on-screen menu displays an alphanumeric text string denoting the particular category attribute, such as "VIOLENCE" or "NUDITY". Displayed adjacent each text string is a numeric value, corresponding to the present threshold value for the associated program category. The subscriber may use the arrow keys of the remote controller to move from one program category to another. Additional arrow keys may be used to increment or decrement the threshold value for the selected program category. Alternatively, a numeric keypad on the controller may be used to directly enter the desired threshold value. Moreover, a bar-graph type display may be employed for the threshold value, either replacing or augmenting the displayed numerical value.

As each television program is received by the decoder apparatus, the decoder apparatus compares the extended program category codes, contained within the program's access control data, with the threshold values within the decoder apparatus' corresponding extended user category register. If any of the extended program category values are greater than the corresponding threshold value previously established by the user, viewing of the program, portions of a program, will be precluded, inasmuch as the decoder apparatus will cease outputting the program's video signal to the video display. Viewing a particular program will be authorized only when each extended program category code is less than or equal to the contents of the associated extended user category register.

Keycard authorization provides an additional level of controlling a subscriber's access to cable television programming. Each subscriber's decoder apparatus includes a keycard input/output port. This port accepts a credit card sized keycard, which may be physically inserted into and removed from the port. When inserted into the port, a bidirectional data link is provided between the keycard and the decoder apparatus.

The keycard comprises a commercially available "smart card", comprising a microprocessor, read-only memory, random access memory, and I/O interface, all contained within the credit-card sized keycard. The keycard, provided to individual subscribers by the CATV service provider, is each preprogrammed to function as a signature analyzer. Each keycard is programmed to receive a sequence of digital values from the associated decoder apparatus over the I/O interface. The microprocessor within the keycard performs a conventional signature analysis algorithm upon these received data values. For example, the data output to the keycard may include a key value. The remaining data output to the keycard will each be applied to a prestored permutation table. Each permuted value derived from the permutation table will be exclusive-ORed with the key value, from which a single bit for the keycard's output value is extracted. As a result, a particular result, or signature value is determined, which is a function of the particular sequence of values input from the decoder apparatus.

The decoder apparatus compares the signature value received over the keycard interface with a keycard authorization code, previously received within the access control data of a video frame. If the signature value and the keycard authorization code are equal to each other, the subscriber is deemed to be authorized to view the associated programming. If not, the decoder apparatus will preclude the display of the associated video display. The CATV service provider periodically inserts both the sequence of digital values to be input to the keycard, and the keycard authorization code, into the access control data within the broadcast video frames.

The present encoder apparatus 100 for embedding viewer access control data within a preexisting television signal is shown in FIG. 1 as comprising database processor 101, a plurality of channel processors 102, a plurality of signal encoders 103, and signal combiner 104. Database processor 101 comprises a management information system (MIS), and, in the preferred embodiment, is an IBM PC-compatible computer.

Database processor 101 is employed to generate two types of files: a program-specific control parameter file (CPF) and a schedule file. These files contain program identification information, program scheduling information, and all of the program and user authorization information. For a given television program, an associated CPF file will be generated to indicate the particular user pay-per-view codes, program pay-per-view codes, user identification codes, user class codes, program class codes, basic user category codes, basic program category codes, extended program category codes, keycard input values, and keycard verification codes. The schedule file designates the particular times at which each individual program, identified by its corresponding CPF file, is to be aired.

Figure 23:
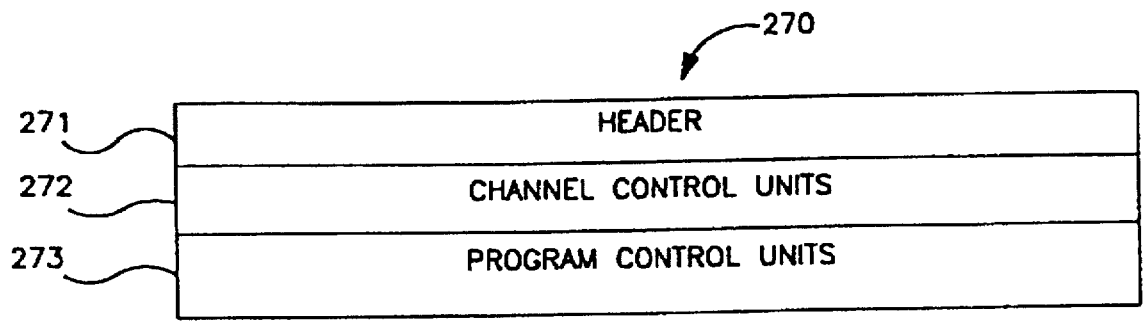
FIG. 23 of the drawings is a diagram of the schedule file data structure.
Figure 24:
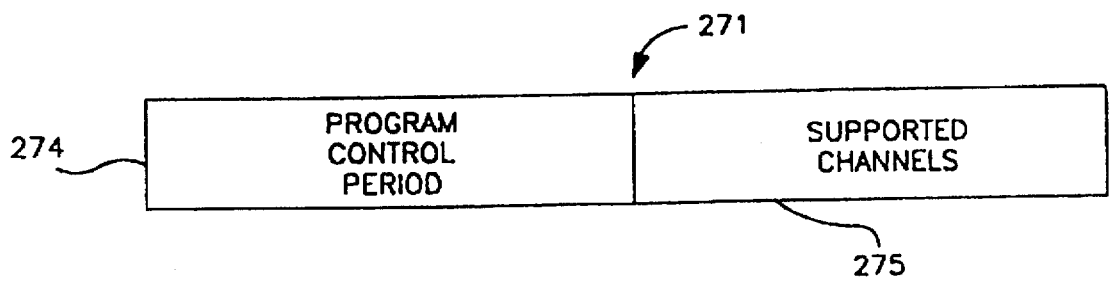
FIG. 24 of the drawings is a diagram of the header portion of the schedule file.

The structure of schedule file 270 in shown in FIG. 23 as comprising schedule file header 271, a plurality of channel control units 272, and a plurality of program control units 273. As shown in FIG. 24, schedule file header 271 includes a program control period value 274 and a supported channels value 275. Supported channels value 275 indicates the total number of cable television channels supported by the system, and for which control information is present within the schedule file. Program control period value 274 identifies the period, or frequency, with which new program control information is to be inserted within the access control information portion within the video frames. In the preferred embodiment, program control program value 274 is set to a value indicative of one minute in time. Accordingly, new, updated program classification information will be imbedded into the global data portion of the access control information once per minute. If desired, a finer control, or granularity with respect to the frequency of updated program access control information, may be achieved by varying the contents of program control period value 274. For example, program control period value 274 may be set to a value indicative of one second in time, indicating that updated program access control information is to be inserted into video frames each second.

Figure 25:
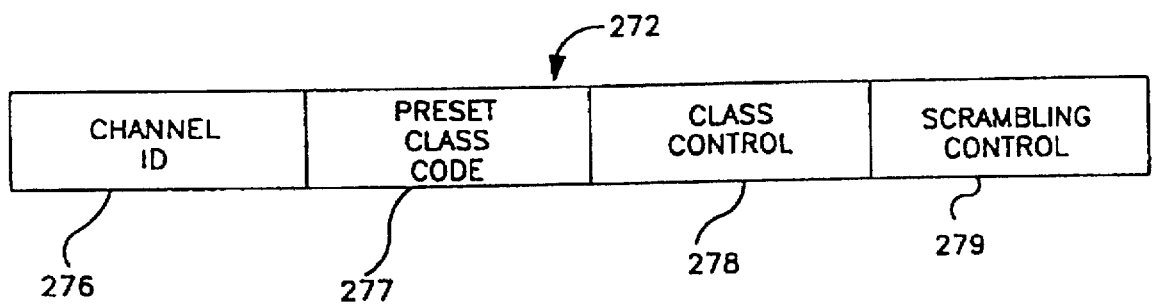
FIG. 25 of the drawings is a diagram of the channel control unit portion of the schedule file.

For each supported programming channel, as indicated by supported channels value 275, the schedule file includes a channel control unit 272. A typical channel control unit 272 is shown in FIG. 25 as comprising channel ID 276, preset classification code 277, classification control flag 278, and scrambling control flag 279. Channel ID 276 is a numeric value indicative of the particular channel number corresponding to the present channel control unit 272. Preset classification code 277 is a default program class code for all programming within the channel identified by channel ID 276. Class control 278 is a binary flag, indicating whether the preset class code is to be inserted into all programming for corresponding to channel ID 276, or whether the program class code is to be varied, in real time, depending upon the contents of associated program control units 273 (FIG. 23). Scrambling control flag 279 is a binary flag indicating whether random line inversion is to be employed in scrambling the programming for the channel identified by channel ID 276, or whether programming on the particular channel is to be transmitted in a non-scrambled manner.

For each channel control unit 272, there are a plurality of corresponding program control units 273. In particular, there is a unique control unit 273 for each increment, or slice of time, within the period or frequency designated by the associated program control period value 274 of the associated channel control unit 272. For example, when the program control period is set to a value indicative of one minute time slice, there will be 1,440 corresponding program control units for each channel: one for each minute of time in a 24-hour programming period. In this manner, changes in the values of embedded access control information may be time-synchronized with changes in attributes of the associated television programming content.

Figure 26:
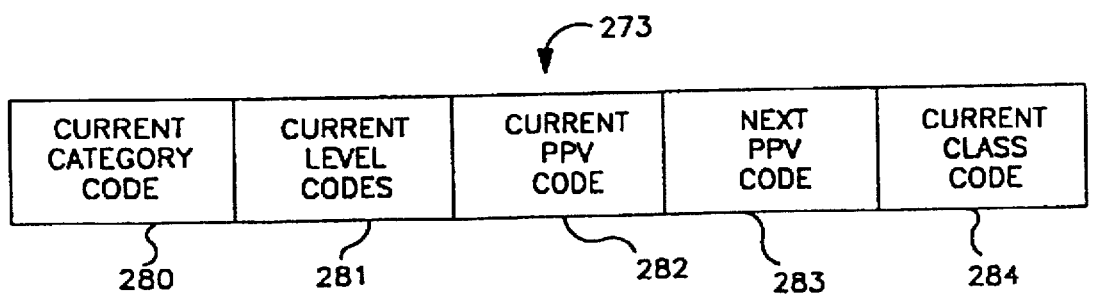
FIG. 26 of the drawings is a diagram of the program control unit portion of the schedule file.

A typical program control unit 273 is shown in FIG. 26 as comprising current category 280, current level codes 281, current pay per view code 282, next pay per view code 283, and current classification code 284. Current category code 280 identifies the program category code for the current television programming, i.e., for the channel and time slice corresponding to the present program control unit. Current level codes 281 contain the corresponding extended program category codes, identifying the particular levels of predetermined programming attributes for the corresponding television programming. Current PPV code 282 indicates the program pay per view code for the present, simultaneously broadcast television programming, while next PPV code 283 identifies the pay per view code for the following pay per view program. Finally, current class code 284 identifies the class of users authorized to receive the present, corresponding television programming.

Each CPF file comprises a CPF header and a plurality of CPF data entries. The CPF header contains global data and authorization/access codes for the corresponding television programming. The CPF header further indicates the number of CPF data entries within the corresponding CPF file. Each CPF data entry comprises a user address, block address, and block addressing enable flag, for each subscriber to be addressed with the authorization information contained in the CPF header.

Database processor 101 can be coupled to up to 32 separate channel processors 102, as shown in FIG. 1. Each channel processor 102 is preferably an IBM PC-compatible computer, and is coupled to database processor 101 via conventional local area network 106. Each channel processor 102 can accommodate up to four channel controllers 105. Each channel controller 105 is preferably an IBM-PC compatible card, which plugs into a conventional ISA bus slot within channel processor 102. Each channel controller 105 governs the insertion of access control data within a single corresponding cable television channel. Inasmuch as the present encoder apparatus 100 can accommodate up to thirty-two channel processors 102, with each channel processor accommodating up to four channel controller cards 105, the present encoder apparatus 100 can insert access control data into 128 separate, individual cable television channels.

Each channel processor 102 reads the schedule file generated by database processor 101, via local area network 106. Channel processor 102 next uses the program scheduling information within the schedule file to retrieve the associated CPF file for each scheduled program corresponding to the particular television channel controlled by channel processor 102. From the CPF file, channel processor 102 reads the information corresponding to the programs to be televised, including all necessary user and program authorization information. Channel processor 102 next reformats this information into a new CPF file for each channel under its control, and downloads this information, via the IBM PC-compatible ISA bus, to the corresponding individual channel controllers 105.

Each channel controller 105 encrypts the control data received from the associated channel processor 102. Each channel controller 105 further formats the encrypted information, into a manner suitable for insertion into unused portions of the video frames of an associated, preexisting television signal. Moreover, each channel controller 105 further controls the scrambling of the associated video television program. Each channel controller 105 is associated with a corresponding signal encoder 103, shown as signal encoder number 1 through signal encoder number 128 in FIG. 1. Each channel controller 105 is coupled to its associated signal encoder via a serial data link 107, such as a conventional RS-232 compatible serial data link. Each signal encoder 103 also receives two additional inputs: a preexisting video signal 108, and a preexisting audio signal 109. Signal encoder 103 combines the formatted access control data received over serial data link 107, with the preexisting television video signal 108. The combined signal, comprising television programming having video frames with embedded access control data, is output from encoder 103 as signal 110. The video frames of signal 110 are scrambled by signal encoder 103, under the control of a corresponding channel controller 105, using random line inversion and sync suppression techniques. Moreover, encoder 103 also scrambles the audio signal 109 associated with video signal 108, outputting corresponding scrambled audio signal 111. In the preferred embodiment, this audio scrambling is performed by conventional upscale frequency shift circuitry. The upscale frequency shift technique for audio scrambling is well known in the art. For example, circuitry for performing both encoding and decoding of audio signals via frequency upshift techniques is disclosed in an article by C. White Halfoat, entitled "Audio Spectrum Shift Techniques", in the October, 1991 issue of Elektor Electronics, pages 16-22.

The output of each signal encoder 103 is fed into a common signal combiner 104. Signal combiner 104 combines each television video signal having embedded access control data 110, and each corresponding scrambled audio signal 111, into combined, encoded television signals suitable for transmission over a common controller. Output 112 of signal combiner 104 is a common antenna television signal, suitable for distribution by a conventional cable television network.

Figure 2:
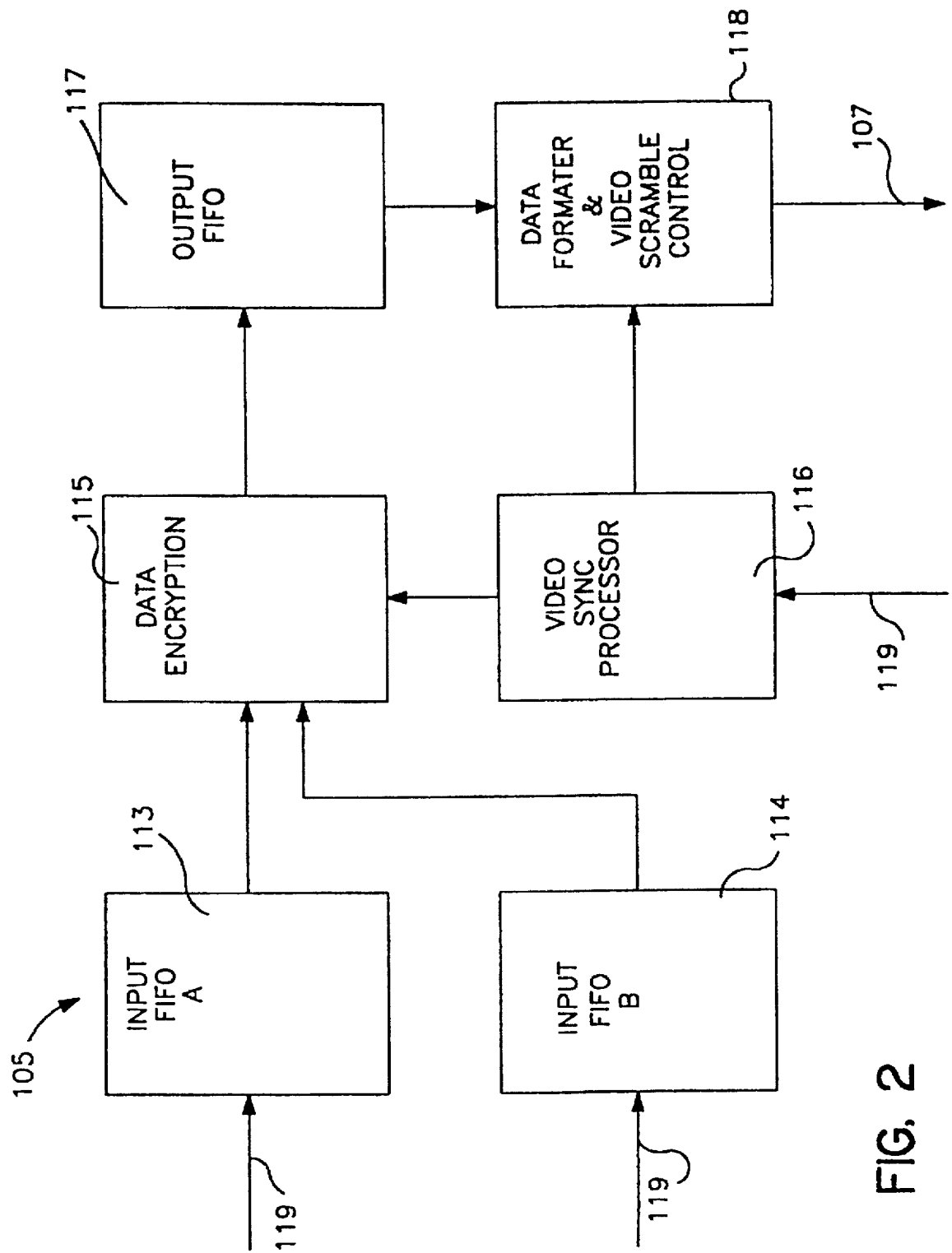
FIG. 2 of the drawings is a schematic diagram of the channel controller.

An individual channel controller 105 is shown in FIG. 2 as comprising two input FIFO (first in, first out) buffers 113 and 114, data encryption unit 115, video sync processor 116, output FIFO 117, and data formatter/video scramble control unit 118. Input FIFOs 113 and 114 each receive access control data from the associated channel processor 102 (FIG. 1) via ISA computer bus backplane 119. Input FIFOs 113 and 114 operate cooperatively, in a "ping-pong" manner. While one input FIFO is outputting data to data encryption unit 115, the other input FIFO may receive additional information from the associated channel processor. When one input FIFO is empty and the other is full of data, the roles of the two input FIFOs are reversed. The input FIFO which previously received input data from the associated channel processor now outputs to the data encryption unit, while the now-empty FIFO is again free to receive further information from the associated channel processor.

Data received by input FIFOs 113 and 114 are forwarded to data encryption unit 115. Data encryption 115 performs a modified version of the conventional DES (data encryption standard) algorithm. DES is a public domain, cryptographic algorithm of validated strength, adopted as a standard by, among others, the U.S. government. Encryption of the access control data by data encryption unit 115 reduces the likelihood that unauthorized viewers will be able to view associated television programs, such as by attempting to use a third-party's unauthorized television decoder apparatus. Video sync processor 116 receives composite video sync signals 119 from a corresponding signal encoder 103 (FIG. 1). The composite sync signal 119 is used by video sync processor 116 to control the particular positions within a video frame where the encrypted data is to be inserted. In this manner, it can be assured that access control data is placed only into unused, non-viewable portions within the vertical blanking interval of each video frame. Encrypted access control data is forwarded from data encryption unit 115 to an output FIFO 117 for temporary storage, in order to synchronize insertion of the encrypted data into the non-viewable portions of video frames. The output of FIFO 117 is forwarded to data formatter/video scramble controller 118. This unit provides final formatting of the encrypted access control data for insertion into unused portions of a video frame. In particular, conventional EDAC (error detection and correction) information is appended to the encrypted access control data. As is known in the art, conventional EDAC circuitry adds additional hamming code error correction bits to each word of associated, encrypted access control data. This allows corresponding EDAC decoding circuitry, contained within each subscriber's decoder apparatus, to detect, and then correct, isolated single-bit errors which may occur in access control data portion of the video stream.

Moreover, data formatter/video scramble control unit 118 also provides the control signals to signal encoder 103 which are necessary to visually scramble the corresponding, preexisting video signal, to preclude unauthorized viewing of programming broadcast over the CATV network. In the preferred embodiment, this video scrambling is performed by random line inversion. Each individual line of video information, within each frame of the preexisting video signal, is either passed unchanged, or is inverted in amplitude. Whether or not a particular line of the video frame is to be inverted is determined by a programmable random signal generator (PRSG). An initial, randomization seed is employed by the PRSG, which uses the seed as a starting point for a pseudo-random sequence of binary values. A new randomization seed is employed for each video frame. Each seed comprises an 8-bit value, including two 4-bit components. The first 4-bit component comprises a randomly selected seed value between 0 and 15, placed into a current seed register. The second 4-bit value comprises a 4-bit frame counter. Broadcast video frames are logically subdivided into groups of N consecutive frames. In the preferred embodiment, N is set to 16. Frames within each group numbered frame 0 through frame 15. At the beginning of each frame within each 16-frame group, a new seed is loaded into the PRSG. The same randomly-selected seed value is used for the four least-significant bits. The frame number corresponding to the current frame within the 16 frame group is used for the four most-significant bits. A 4-bit binary counter, clocked once each frame, is employed to generate the frame count component of the video seed. The 4-bit frame count, together with a 4-bit next seed value stored within a next seed register for use by the next 16-frame group, is generated by the data formatter/video scramble control unit 118 for each video frame, and is placed into the control data output of controller 118. For each new group of 16 frames, the contents of the next seed register are transferred to the current seed register. Accordingly, a decoder unit receiving the video signal, including the encoded access control data, can employ the received video seed in a similar PRSG circuit, in order to descramble the video signal using the same, random line inversion process.

Transmission errors may occasionally occur as access control data is sent over the CATV network. Such errors may occur, for example, due to the injection of noise from external sources into the coaxial cable of the network. Isolated errors can be detected and corrected by the EDAC circuitry. Less isolated, multiple-bit errors, however, may be incapable of correction. Should such errors occur in the video seed portion of the access control data, the decoder apparatus will not receive the proper seed to decode the next video frame, which will remain scrambled and incoherent to viewers.

The inclusion of a frame counter component into the video seed, as described above, greatly reduces the likelihood that the PRSG within the decoder apparatus will become out of sequence with the PRSG within data formatter/video scramble controller 118. As described in further detail below, each subscriber's decoder apparatus includes a 4-bit frame counter coupled to a PRSG, a current seed register, and a next seed register. For each video frame, data formatter/video scramble controller 118 outputs the current frame count and the video seed for the next group of 16 frames, for inclusion in the access control data.

Within the decoder apparatus, if a valid 8-bit seed value is received for a given video frame, the 4-bit frame count component is loaded into the frame counter, and the 4-bit next seed component is loaded into a next seed register. If no valid seed value is received in the access control data, the frame counter is not loaded with new data but is instead incremented for the next video frame. Whenever the frame counter's output rolls over from 15 to 0, as indicated by a carry-out flag, a new 16 frame group is deemed to occur. The contents of the next seed register are transferred to a current seed register. The contents of the current seed registers are, in turn, loaded into the PRSG, along with the contents of the frame counter, at the beginning of each video frame.

In this manner, the PRSGs within the encoder and decoder may stay in synchronization with each other, even if the transmitted video seed is occasionally corrupted. All that is required to maintain synchronization is that one valid 8-bit video seed be transferred within each group of 16 frames.

The final access control data 107, including encrypted, error correction encoded access control data, as well as random line inversion control data, is output to a corresponding signal encoder 103 (FIG. 1).

Figure 3:
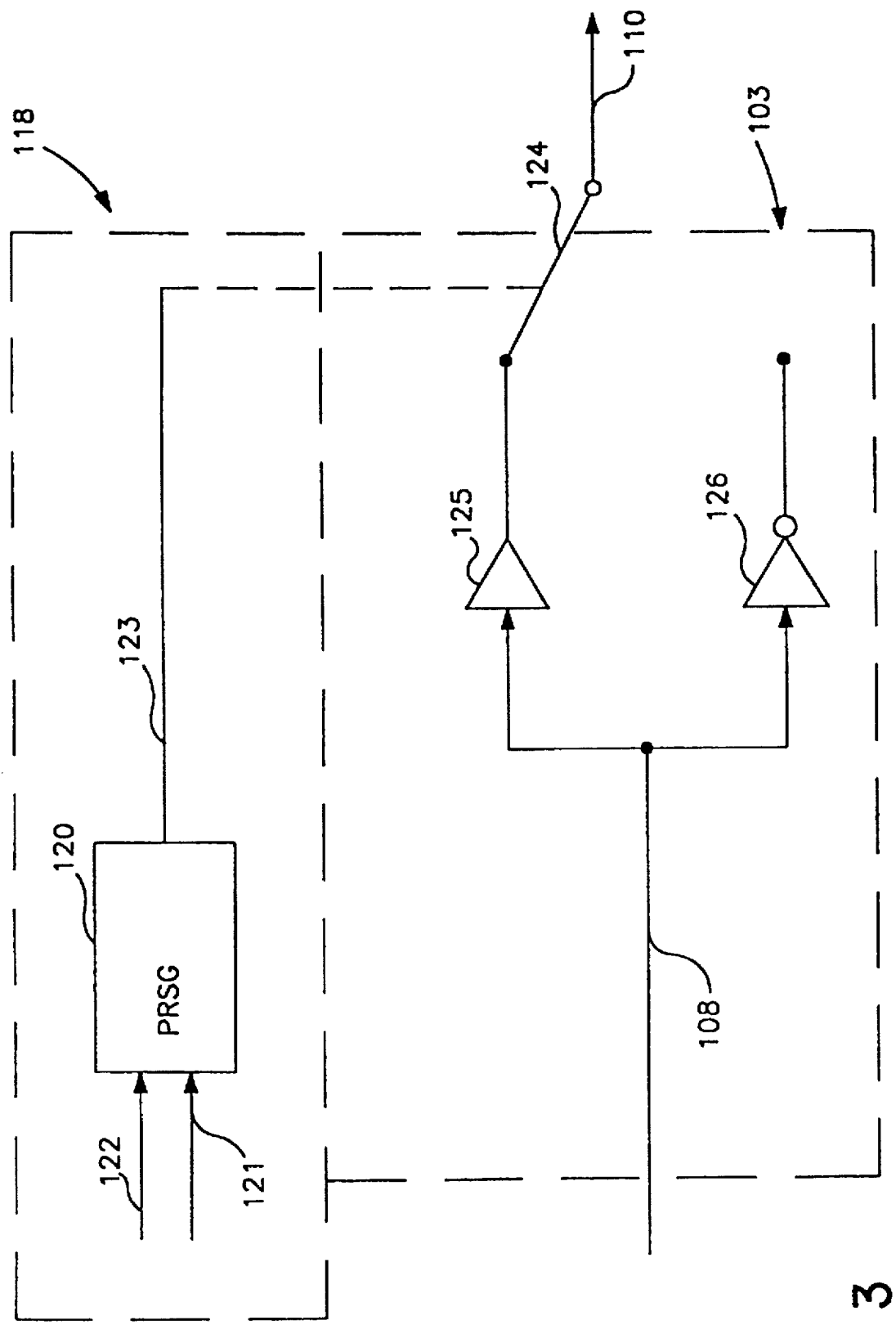
FIG. 3 of the drawings is a schematic diagram of a portion of the data formatter/video scramble control unit and the video encoder.

The circuitry for performing the random line inversion is shown in FIG. 3 as comprising programmable random signal generator 120, non-inverting buffer 125, inverting buffer 126, and analog switch 124. Programmable random signal generator 120, contained within data formatter/video scramble control unit 118, receives an 8-bit value 121, including both frame count and seed components, via parallel load data inputs. The clock input to PRSG 120 is connected to new line signal 122. New line signal 122 is a control signal having a rising edge corresponding to the beginning of each new horizontal scan line within each video frame. In this manner, a new random binary digit, based upon an initially loaded seed, is generated by PRSG 120 for each horizontal scan line within a frame. Output 123 from PRSG 120 is accordingly a continuous, serial stream of binary data, with a new single-bit value being output for each horizontal scan line. As shown in FIG. 3, the pseudo-random sequence 123 is used to control the "up" or "down" position of analog switch 124, contained within a corresponding signal encoder 103. Signal encoder 103 receives an unencoded, preexisting video signal 108 as input. This signal is routed simultaneously to two buffers: non-inverting buffer 125 and inverting buffer 126. The present position of analog switch 124 governs whether an inverted or non-inverted version of video signal 108 is output from the signal encoder as scrambled video 110. If the present output 123 of PRSG 120 is a logic "0", the non-inverting buffer is selected. If the present output 123 of PRSG 120 is a logic "1", however, the inverted output of buffer 126 is instead selected. In this manner, the random, serial binary output 123 of PRSG 120 in turn creates frames of video data, wherein each horizontal scan line of the video frames is randomly either inverted or passed in a non-inverted manner.

Figure 4:
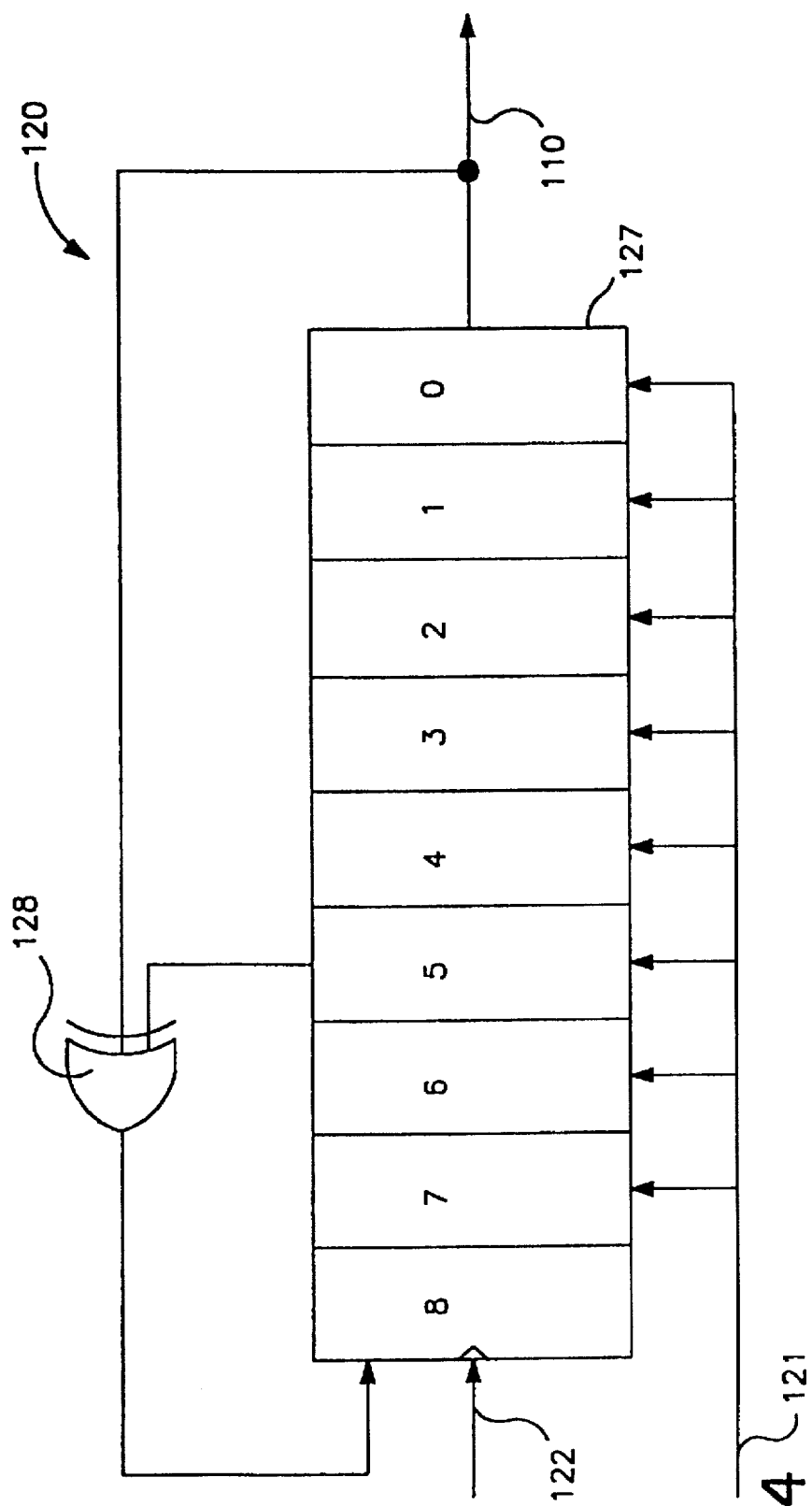
FIG. 4 of the drawings is a schematic diagram of the programmable random signal generator.

PRSG 120 is shown in FIG. 4 as comprising a linear feedback shift register 127. Shift register 127 is a 9-bit shift register, having parallel input, serial input, and serial output capabilities. For each video frame, a new 8-bit seed 121 is parallel-loaded into shift register 127. Thereafter, for each horizontal scan line within the frame, new-line signal 122 generates a clock input to shift register 127, causing the contents of shift register 127 to shift from the leftmost, most significant bit, towards the rightmost, least significant bit. Exclusive-OR (XOR) gate 128 receives, as input, the present value of bit position 4 of shift register 127, as well as the random binary serial pattern 123, shifted out of the least significant bit of shift register 127. The output of XOR gate 127 is fed back into the serial input of the most significant bit of the shift register. In this manner, as shift register 127 is clocked for each horizontal scan line, pseudo-random binary stream 123 is created.

The circuitry for embedding the encrypted, error correction-encoded access control data into the preexisting video signal 108 is shown in FIG. 5 as comprising level shifter 130, buffer 131, and analog switch 132. Level shifter 130 converts binary access control data 107 from TTL-compatible signal levels to video-compatible signal levels. Logic "1" values are converted from a voltage of approximately 5 volts to approximately 66% of the voltage corresponding to peak white video. Logic "0" values are converted from approximately 0 volts to the voltage corresponding to 0% of peak white video. Control signal 129 determines the position of analog switch 132, and, accordingly, determines whether the output video data 133 contains raw input video 108 (as buffered by buffer 131 ), or access control data, as output from level shifter 130. Control signal 129 positions analog switch 132 to receive the output of level shifter 130 during unused, non-displayable portions of each video frame, during the vertical blanking interval. In particular, access control data is inserted within horizontal scan lines numbers 1, 2, 3, 623, 624, 625, 311,312, 313, 314, 315, and 316 of each video frame. At all other times, control signal 129 positions analog switch 132 to receive raw video data.

The embedded digital access control data within a typical horizontal scan line 135 is shown in FIG. 6. A single horizontal scan line is transmitted in approximately 64 microseconds, of which 52 microseconds is available for the insertion of control data. The digital data is represented in binary, two-level non-return to zero (NRZ) representation, with a bit rate of 6.9375 megabits per second. For each scan line 135 in which access control data is inserted, 42 data bytes 138 are inserted. These data bytes are preceded by a byte sync value (equal to 15 in hexadecimal notation) which, in turn, is preceded by two sequential clock sync bytes (each equal to AA in hexadecimal notation). The peak of the second logic "1" of the second clock sync byte is located approximately 12 microseconds from the falling edge of the horizontal sync pulse corresponding to the associated horizontal scan line.

Figures 7, 15, 16:
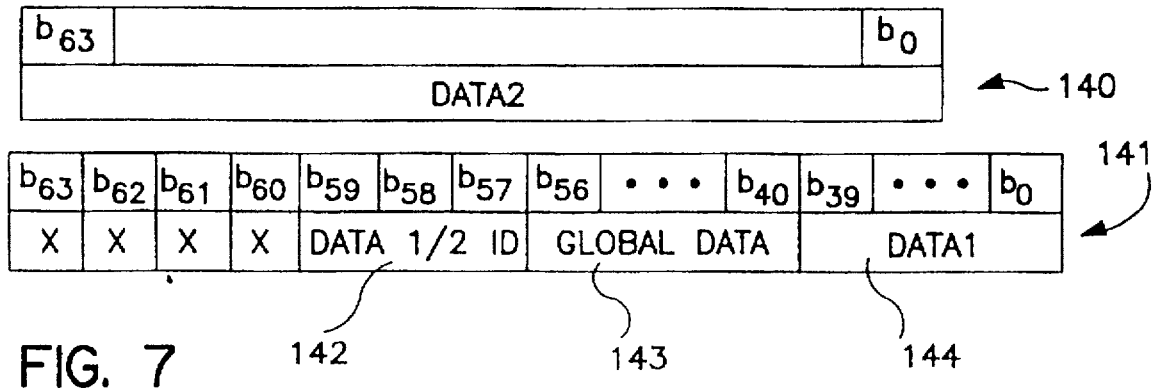
FIG. 7 of the drawings is a diagram of the data format of the access control data which is inserted into the video frames.
FIG. 15 of the drawings is a diagram of the program status portion of the global data portion of the access control data.
FIG. 16 of the drawings is a time-line diagram of the pay-per-view authorization process.

The overall data format for the encrypted access control data is shown in FIG. 7 as comprising two consecutively-transmitted 64-bit blocks of data, including first block 140 and second block 141. All 64 bits of first block 140 are termed "DATA2". The first 40 bits of second block 141 are termed "DATA1". Bits 40–56 of the second block is the global data 143, i.e., information which is common to all CATV subscribers. The next three most significant bits of second block 141, designated DATA1/2 ID 142, indicate the particular meaning associated to the information contained with the corresponding DATA1 144 and DATA2 140 values.

FIG. 8 is a table depicting the various potential values for global data 143. For each type of global data 143, there is a corresponding 9-bit address component, as shown in column 145, and a corresponding 8-bit data component, as shown in column 146. As shown in FIG. 8, when the address field is equal to 0h, the corresponding data field is equal to the 8-bit video seed, including the 4-bit frame count component and the 4-bit next seed component. When the address field is equal to 1h, the corresponding data field is equal to the program pay-per-view (PPV) code, uniquely identifying the corresponding television programming into which the global data is presently inserted. When the address field is equal to 2h, the data field represents a numerical value indicating which horizontal scan line contains automatic gain control (AGC) information. When the address field is equal to 3h, the data field represents an anticipated 8-bit value to be received from a keycard plugged into a cable TV decoder unit during keycard authorization, in order to verify that a user is authorized to receive the present programming.

As shown in FIG. 8, when the address field is equal to 4h–7h, the corresponding 32 bits of data field entries indicate which classes of users are authorized to receive the present programming. Up to 32 classes of users are supported, with each class corresponding to a bit position, $b_0$-$b_{31}$. For each of the 32 bit positions within these four data bytes, a logical "1" indicates that a corresponding class of subscribers is authorized to receive the present programming. Moreover, for each bit position, a logical "0" indicates that a corresponding class of subscribers is not authorized to receive the present programming.

For address entries equal to 8h, the corresponding data field indicates the present channel number on which the present programming is to be received. When the address field is equal to 9h, the corresponding data field contains the 8-bit basic program category code indicating whether the program content of the present television program into which the global data is embedded falls within any of eight predetermined content attributes. In the preferred embodiment, the eight predetermined attributes are selected to correspond to categories of potentially offensive programming content, such as nudity, profanity, violence, adult situations, etc. For example, the least significant bit of the basic program category code field corresponding to address 9h may be set to "1" whenever the corresponding program contains violent programming.

As shown in FIG. 8, addresses Ah–Fh are used to program the system clock within each decoder apparatus. Addresses Ah–Fh allow each decoder apparatus' system clock to receive the present year, month, week, day, hour and minute.

Addresses 10h–FFh correspond to 240 8-bit data values, decoded and processed by each subscriber's decoder apparatus as comprising a displayable on-screen message. Each 8-bit data value within this corresponding range of address values is mapped to a particular pixel location in a 24 pixel-wide by 10 pixel-tall array. Accordingly, addresses 10h–FFh may be employed to display a "logo" corresponding to the present TV channel in a corner of the display. Alternatively, these 240 bytes may be employed to display any brief alphanumeric message in a corner of the video display.

As shown in FIG. 8, address values equal to 100h–17Fh within the global data correspond to a preset channel table. As explained in detail below, an initial, preset channel table is downloaded from the cable television service provider to each individual subscriber's decoder apparatus. By varying the contents of the preset channel table, the particular channel numbers to which individual frequencies are assigned can be arbitrarily varied. In this manner, the order, or sequence of channel numbers in which the various television channels are assigned and received by a user's decoder unit, may be varied according to each individual subscriber's own preferences.

Address values within the global data in the range of 180h–18Fh correspond to 16 sequential bytes of data to be output by each decoder apparatus as the keycard input data. When keycard authorization is employed to verify that a particular decoder apparatus is authorized to receive programming, the 16 corresponding data bytes for these address fields are sequentially output from the decoder apparatus to the attached keycard. The keycard processes these 16 bytes, returning an 8-bit signature value. The anticipated signature value has also been previously transmitted, identified by address 3h. Accordingly, a decoder apparatus will compare the previously received keycard output to assure that 8-bit value received from the keycard corresponds to the anticipated signature.

For address values equal to 190h–19Fh, the corresponding data values represent the extended program category codes; i.e., the "levels" of programming content attributes within particularly, predetermined categories.

Figure 9:
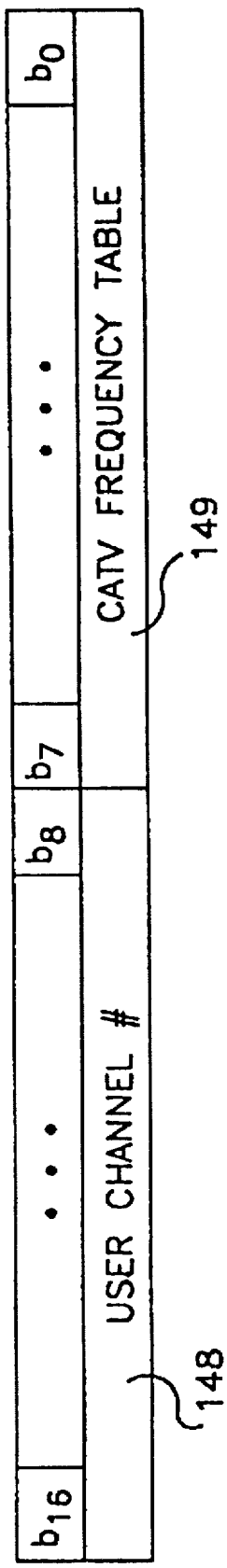
FIG. 9 of the drawings is a diagram of the preset channel table portion of the global data portion of the access control data.
Figure 10:
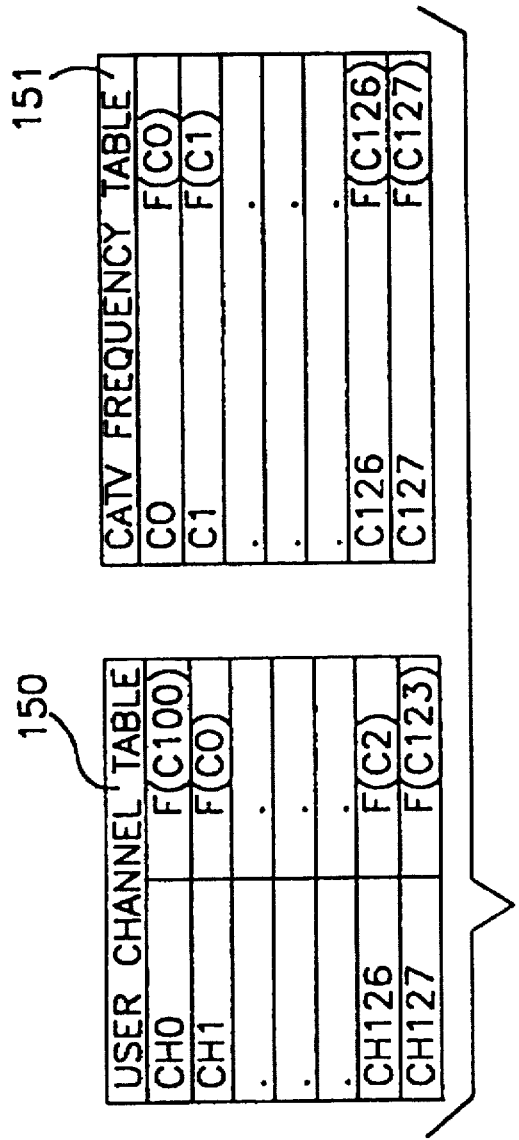
FIG. 10 of the drawings is a diagram of the frequency table and the user channel table.

The preset channel table portion of the global data, corresponding to addresses 100h–17Fh, are further explained by reference to FIGS. 9 and 10. As shown in FIG. 9, the 9-bit address field, having a value of 100h–17Fh, corresponds to a user channel number (i.e., a channel number as depicted upon a display of a user's cable television decoder unit). The corresponding 8-bit data value 149, designated CATV frequency table in FIG. 9, corresponds to a particular entry within a CATV frequency table, stored in non-volatile memory within a user's cable television decoder apparatus. A CATV frequency table, and an associated user channel table created by a sequence of data within the global data stream, is shown in FIG. 10. CATV frequency table 151 contains 128 entries, designated C0–C127, with one entry for each potential cable television channel. For each entry, there is a corresponding frequency, designated F(C0)-F(C127), identifying the particular frequency at which each sequential cable television channel is transmitted. The preset channel table of FIG. 9 is employed to create a user channel table 150, an example of which is shown in FIG. 10. The first entry in user channel table 150 indicates that user channel 0, designated Ch0, has been assigned the frequency of cable television channel 100, designated F(C100). User channel 1, designated Ch1, has been designated the frequency of cable TV channel 0, designated F(C0). User channel 126 has been assigned the frequency of cable television 2, designated F(C2). User channel 127, designated Ch127, has been assigned the frequency of cable television 123, designated F(C123). In this manner, the downloading of 128 consecutive entries of global data, corresponding to addresses 100h–17Fh, allows a preset 128 entry user channel table to be generated. This creates an initial map of cable television frequencies to user channels (i.e., channel numbers, as depicted upon the display of the individual user's decoder unit). Thus, an initial selection of channel ordering may be downloaded into a user's decoder unit. If desired, a user may be given the capability to alter the contents of user channel table 150. For example, a user may alter the table locally, via commands entered by a remote control interface, using conventional on-screen system menus and programming methods. In this manner, a user may modify a previously loaded preset channel table, so as to order the assigned channels of various cable TV stations such that channels preferred by the particular user are assigned sequential, lower-valued user channel numbers. Moreover, a user may edit the prestored channel table so as to completely eliminate viewing of any channels which the user finds undesirable.

FIGS. 11 and 12 illustrate the usage of the extended program category codes, assigned addresses 190h–19Fh, (as shown in FIG. 8). Sixteen program categories are supported, designated program categories 0h through Fh as shown in row 152 of FIGS. 11–12. For each program category, a 4-bit value, designating a level or quantity of current programming content for the associated program attribute category, is transmitted within the global data and stored within an extended program category register. For example, as shown in FIG. 11, program category 0 has a current program level of 0. By way of example, program category 0 can be preassigned to violence, with the current program level of 0 indicating that the present program in which the associated global data is inserted contains a negligible quantity or level of violence. Similarly, program category 1 may correspond to a level or quantity of profanity within the associated television programming. The associated current program level of 2 indicates that the current programming contains some profane language, but in relatively small quantity or degree, inasmuch as 2 is relatively low value within the potential range of 0 to Fh. Row 153, showing the user preset maximum levels, reflects a maximum level, which a user has previously selected for each program category and caused to be stored in an extended user category register. Assuming for example, that program category 0 corresponds to violence, the user has previously established a threshold of 3, indicating that the user wishes to preclude receipt of television programming having attributes of a quantity or level of violence for which the CATV service provider has assigned a qualitative or quantitative value of 4 or higher.

In the example of FIG. 11, viewing of the associated television program will be precluded by the user's decoder apparatus, inasmuch as the current programming content, with respect to program categories 6h and Eh, contains a level of programming content attributes which exceeds the threshold levels previously established by the individual viewer.

In the example of FIG. 12, however, the current programming level, for each extended program category within the television program into which the example access control data has been embedded, does not exceed the maximum threshold level, previously established by the individual viewer. Accordingly, viewing of the associated television program will not be precluded by the viewer's decoder apparatus.

Referring to FIG. 7, DATA 1/2 ID 142 is a flag, indicating whether the associated DATA2 value 140 and DATA1 value 144 reflect master programming data, to be used by the decoder apparatuses of all subscribers, whether these data values reflect single user programming data, to be decoded by an individual subscriber's decoder unit, or by decoder units belonging to a discrete block of individual subscribers. When DATA 1/2 ID 142 is equal to "000", the associated data values correspond to a single user or a block of users. Otherwise, the corresponding data values correspond to master programming data for all users.

Figure 13:
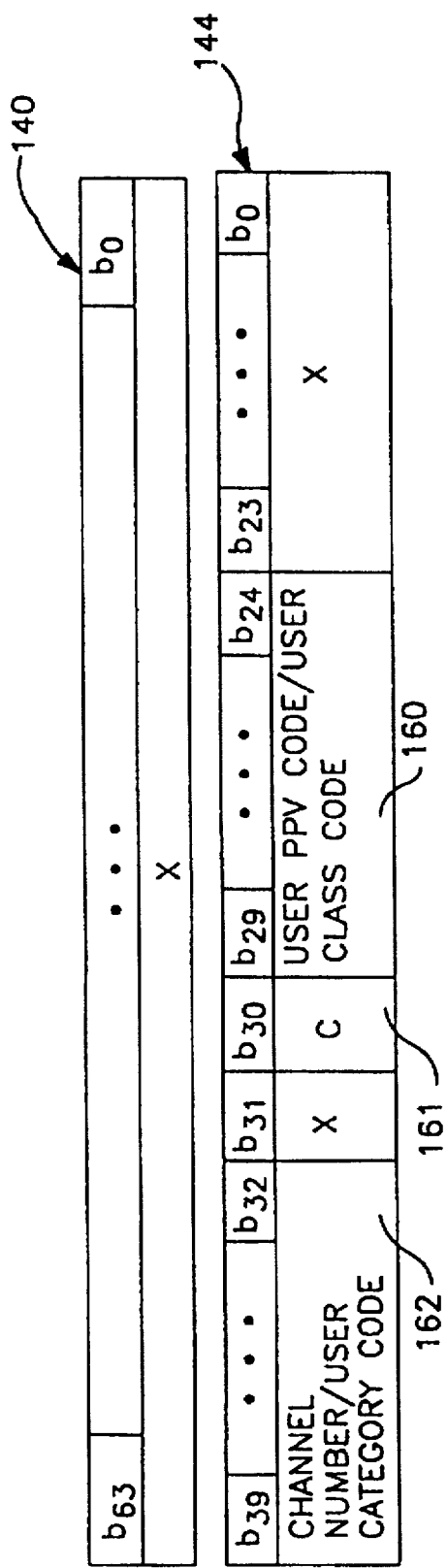
FIG. 13 of the drawings is a diagram of the authorization code portion of the access control data.

The master program data format for DATA1 144 and DATA2 140 is shown in FIG. 13. The 64-bit DATA2 value is unused, as is bits 0–23 and bit 31 of the DATA1 144 value. The DATA1 value includes an 8-bit channel number/user category code 162, and a 6-bit user PPV code/user class code 160. The DATA1 value further includes a single-bit flag, denoted "C", designating the present usage of the remainder of the DATA1 value. When C is equal to 0, channel number/user category code 162 indicates an individual CATV channel number, and user PPV code/user class code 160 indicates a corresponding user pay-per-view code. For example, if C is equal to 0, the channel number is equal to 6, and the PPV code is equal to 12, all users are authorized to watch channel 6, when a program is aired having a pay-per-view code equal to 12. Each user's decoder apparatus will store the value of 12 in one of two pay-per-view registers within the decoder unit.

Figure 14:
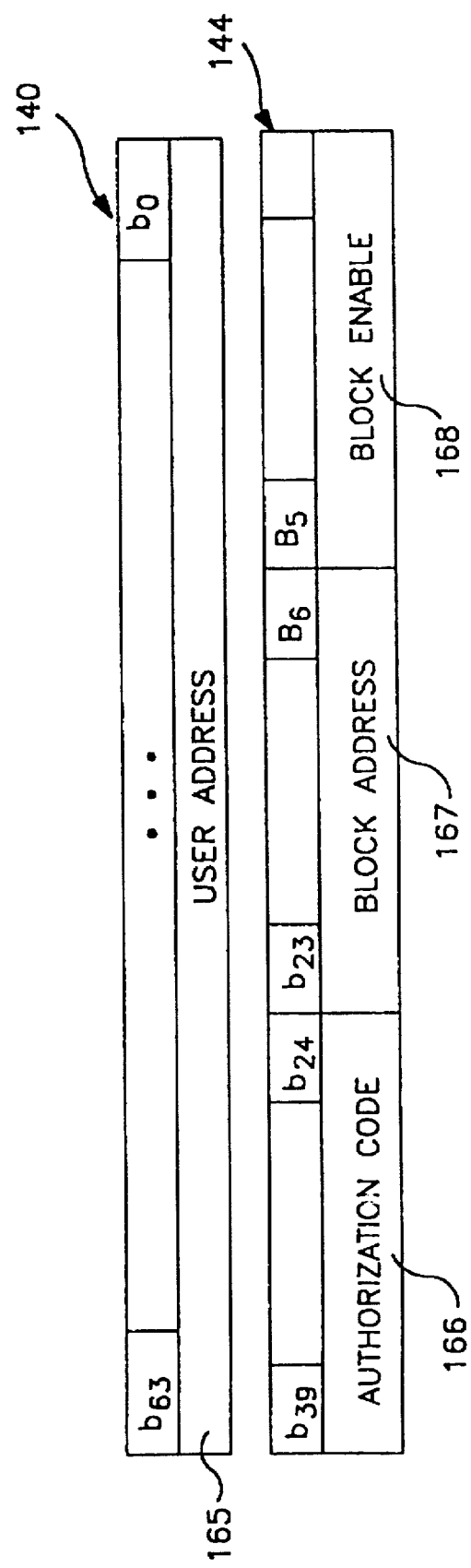
FIG. 14 of the drawings is a diagram of the single user program portion of the access control data.

When C is equal to 1, channel number/user category code 162 refers to a user category code, while user PPV code/user class code 160 indicates a basic user class code. For example, if C is equal to 1, user class code is equal to 12, and user category code is equal to 01010110 in binary notation, all user decoder apparatuses are programmed to place the user within class 12, among the range of potential classes of viewers. Moreover, each user will be precluded from viewing programs categorized as containing programming content attributes within categories 0, 3, 5, and 7, inasmuch as bit positions corresponding to these program categories are set to 0 within the user category code. The format of the DATA1 and DATA2 values for single user program data and block user program data (i.e., when DATA 1/2 ID is equal to 000) is shown in FIG. 14. The DATA2 value contains a 64-bit user address 165. The DATA1 value 144 contains a 16-bit authorization code 166, an 18-bit block address 167, and a 6-bit block enable value 168. Block address 167 and user address 165 cooperate to form complete user addresses, with block address 167 comprising the higher-order address bits, and user address 165 comprising the lower-order address bits. Block enable 168 is a flag, designating whether the associated information is to be addressed solely to an individual user, or to a block of users. When block enable 168 is set to indicate that a block of users is to be addressed, only the higher-order block address bits 167 are deemed relevant. All users with sub-addresses falling within the higher-order block address value 167 will be addressed. Accordingly, each decoder apparatus will check the block enable value to determine if full address comparison (block address plus user address) or block address comparison (block address only) is to be employed to determine whether the decoder apparatus is presently being addressed. Authorization code 166 contains user pay-per-view codes, user classification codes, and program categories, in the same manner as the master program data format shown in FIG. 13. Authorization code 166 contains a channel number/user program category value 162, a user PPV code/user class code 160, and a C code 161, as shown in detail in FIG. 13. Accordingly, an individual user may be addressed in order to receive a user pay-per-view code, to be stored within a user pay-per-view code register within the subscriber's decoder apparatus. Moreover, a single subscriber's decoder apparatus may be addressed in order to be programmed with a user class code, indicating which class of users the individual subscriber belongs to, as well as a user category code, indicating which particular categories of programming attributes (such as programming containing violence, obscenity, etc.) the particular user is to be precluded from viewing.

The program PPV code, assigned an address of 1h in the global data format (FIG. 8) contains a 6-bit program pay-per-view code, as well as an additional 2-bit program status code. The decoding and function of the 2-bit program status code is shown in FIG. 15. The status code identifies the particular type of television program in which the associated global access control data is presently embedded. If the channel status is set to 00, the associated program is deemed to be a pay-per-view program. Viewers are authorized to view the pay-per-view programming if they have previously received a user pay-per-view authorization code equal to the program pay-per-view code, if they are among a class of users authorized to receive the present programming, and if the present programming does not contain programming content of a nature which the user has been precluded from viewing (i.e., such as categories of violence, nudity, etc.).

If the program status code is equal to 01, the present television program into which the access control data is embedded is deemed to be a promotional program. Such programming is free to all users, and no prior authorization is required.

If the program status code is equal to 10, the associated programming is deemed to be a free power-on channel. Each individual user's decoder apparatus contains a power-on timer, maintaining an indication of how long the unit has been powered on. In addition, each decoder apparatus employs the power-on timer to generate a power-on flag, indicating that the associated decoder apparatus has been turned on within a brief, predetermined period of time. In the preferred embodiment, this period of time is five minutes. For programming designated as being a free power-on program, a user will be authorized to receive the program while the power-on flag is enabled. If so authorized, the user will be permitted to view the program for the preselected time period during which the power-on flag is enabled, regardless of whether the user has received pay-per-view, class and category authorization for the particular program. Thereafter, viewing by the user will be precluded, unless the user has received prior user pay-per-view, class and category authorization to view the particular, associated television programming.

If the program status is equal to 11, the associated programming is deemed to be a free program, available to all legal users. Each subscriber's decoder unit will verify only that the user is not within class 0, which has been predetermined as designating illegal users, who have not been designated as being within any valid individual class of users. Each subscriber's decoder apparatus will initially establish a user to be within class 0, until a valid user class code is received and addressed to the subscriber via the access control data.

A time-line of the pay-per-view authorization process is shown in FIG. 16. Nine sequential pay-per-view television programs are shown in row 170 as programs P1-P9. Row 171 depicts the 6-bit program pay-per-view code corresponding to each television program, embedded within the global data portion of the access control data. Rows 172 and 173 each disclose user pay-per-view codes, transmitted within the single user data portion of the access control data. Two user pay-per-view codes, designated code 1 and code 2, may be stored simultaneously within separate registers of each individual subscriber's decoder apparatus. The use of two separate user pay-per-view code registers allows one pay-per-view code register to be used to authorize receipt of the currently aired television program, and an additional pay-per-view code to be received, prior to the airing of a second pay-per-view program, so as to allow prior authorization of the second pay-per-view television program. In this manner, a relatively large window of time is available in which to transmit user pay-per-view codes for subsequent programming, rather than requiring all user pay-per-view codes to be transmitted in a short time, such as during the gap between two consecutive pay-per-view programs.

In the example depicted in FIG. 16, program P1 is assigned a pay-per-view code of 01. The depicted user's decoder apparatus has not yet received any pay-per-view authorization codes, and both user PPV registers are shown as containing the default value of 00. Accordingly, as reflected in row 174, this particular user is not authorized to receive television program P1. Television program P2 has been assigned a pay-per-view code of 03. Inasmuch as the user does not have a corresponding value within a user PPV code register, receipt of this program is similarly unauthorized. As shown in FIG. 16, a user PPV code of 12 is transmitted to the example subscriber during program P2. Inasmuch as the next program, program P3, is assigned a program PPV code of 12, and inasmuch as the example subscriber has previously received a corresponding user PPV code, the user is authorized to view program P3. During program P3, a second user pay-per-view code, equal to 02, is also sent to the example subscriber. Accordingly, the following program, program P4, having a pay-per-view code of 02, is similarly authorized to be received. During program P4, a third user pay-per-view code, equal to 22, is forwarded to the individual subscriber's decoder unit. This value of 22 supplants the least-recently received user PPV code, which, in the illustrated example, was 12. Accordingly, the second-received UPPV code of 02 remains stored within a register in the decoder unit, maintaining authorization to continue receiving the current program P4. Moreover, receipt of the next program, program P5 with a program PPV code of 22, is also authorized. In the example of FIG. 16, no additional user PPV codes are received by the depicted subscriber. Accordingly, no further congruences occur between the previously stored user PPV codes of 02 and 22 and the subsequent program PPV codes for programs P6-P9. As a result, viewing of programs P6-P9 is precluded for the illustrated subscriber.

Figure 17:
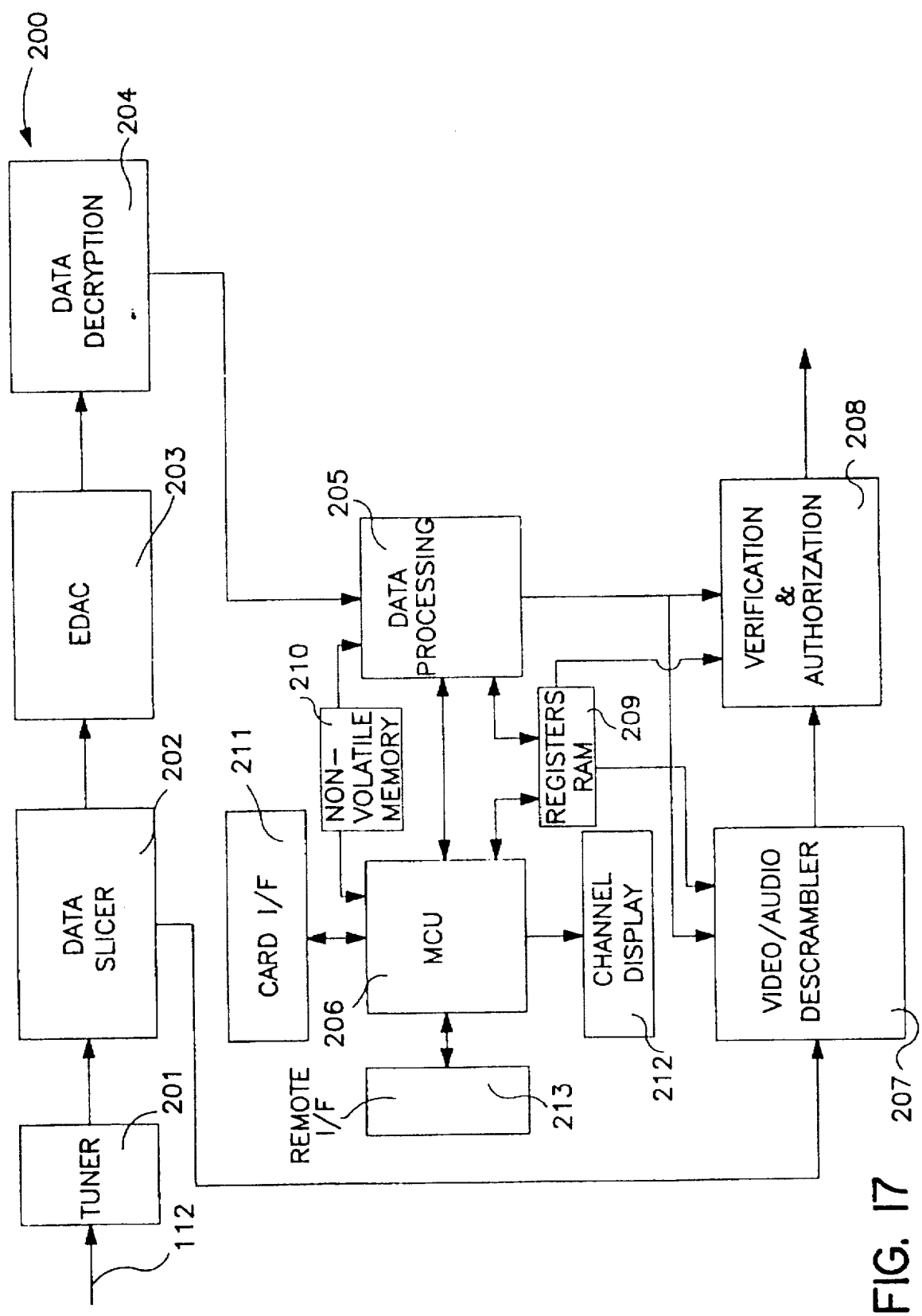
FIG. 17 of the drawings is a schematic diagram of the decoder apparatus.

The present decoder apparatus 200 is shown in FIG. 17 as comprising tuner 201, data slicer 202, error detection and correction unit 203, data decryption unit 204, data processing unit 205, microcontroller unit (MCU) 206, video/audio descrambler unit 207, and verification/authorization unit 208.

Tuner 201 is coupled to the CATV service provider's encoder apparatus via common antenna network 112, and selects which of 128 potential television channels is to be presently decoded and output for display by decoder apparatus 200. Remote interface 213, coupled to MCU 206, allows the user to select a particular channel for tuner 201 via a conventional hand-held remote control unit. This hand-held remote control unit preferably communicates with remote interface 213 via a serial infrared data link. Channel selections received by remote interface 213 are forwarded to MCU 206, which, in turn, adjusts tuner 112 to receive the particular television channel presently selected by the user. MCU 206 further causes a three-digit value corresponding to the selected channel to be displayed upon conventional seven segment channel display 212. Tuner 201 outputs the selected cable television channel signal to data slicer 202.

Data slicer 202 separates the embedded, encoded access control data within the selected television signal, from the remaining audio and video information. As explained above, the access control data is inserted into unused portions of each video frame, during horizontal scan lines corresponding to the vertical blanking interval. Data slicer 202 accordingly monitors the horizontal line synchronization and vertical (frame) synchronization information contained within each video frame, in order to locate the predetermined horizontal scan lines containing the access control data to be extracted. Data slicer 202 further includes a level shifter, in order to level-shift the access control data within each video frame (represented as a percentage of peak white video amplitude) to conventional TTL logic levels, for use within decoder apparatus 200. Data slicer 202 forwards the extracted access control data to error detection and correction unit 203. The remaining, scrambled video and audio components of the selected input television signal is forwarded to video/audio descrambler 207. An analog demultiplexer, coupled to the horizontal sync and frame sync monitor, is employed to properly divide the incoming television signal into its access control data and raw video components.

Error detection and correction unit 203 corrects isolated single-bit errors which may occur in the encrypted access control data extracted by data slicer 202. Such errors may occur, for example, due to noise injection or interference occurring somewhere along CATV network 112. As explained above with respect to encoder apparatus 100, additional, conventional hamming error correction codes are appended to the encrypted access control data. Accordingly, single-bit errors occurring within the access control data may be detected and corrected by EDAC unit 203, whether they occur within the access control data themselves, or within the additional hamming code bits.

The error-corrected access control data is next forwarded from error detection and correction unit 203 to data decryption unit 204. As explained above with respect to encoder apparatus 100, a modified version of the well known, industry-standard DES data encryption algorithm is performed in order to encode the access control data within the video signal. Accordingly, data decryption unit 204 employs conventional decryption circuitry to perform the requisite decoding of the modified DES encrypted data. The decrypted access control data is forwarded to data processing unit 205.

Data processing unit 205 decodes the global data, single-user program data, block-user program data, and master program data contained within the error-corrected, decrypted access control data received from data decryption unit 204. Data processing unit 205 transfers the decoded access control data to appropriate portions of the decoder apparatus 200 circuitry. With respect to the global data portion of the access control data, the address field portion of each global entry is decoded to determine the meaning and proper destination for the associated data field value. The video seed is transmitted to a next seed register within register and memory block 209. The program PPV code, program category code, program class code, and program level codes are similarly stored within corresponding registers for use by verification and authorization unit 208. The keycard output and keycard input values are forwarded to random access memory for use by MCU unit 206, as are the on-screen message and preset channel table. The present year, month, week, day, hour and minute are forwarded to a system clock, in order to maintain time synchronization with the television programming to be received.

Verification/Authorization unit 208 governs whether the particular television signal presently being viewed is to be displayed upon an attached video monitor, or whether viewing of the present user is precluded: either because the individual subscriber has not been authorized to receive the present pay-per-view programming; because the individual subscriber is within a class of users which are not authorized to receive the present programming; because the present programming is within a category of programming which the viewer has elected not to receive; or because the present programming contains programming content attributes of a sufficient level or quantity in excess of a predetermined threshold level, above which the individual subscriber has elected not to receive programming. Logic diagrams of the verification/authorization process are shown in FIGS. 19–22.

FIG. 19 depicts the pay-per-view verification logic. User pay-per-view code registers 229 and 230 each store earlier-transmitted user pay-per-view codes from the access control data. A user pay-per-view code register is loaded within an individual subscriber's decoder unit, whenever master program, single-user program, or block-user program information within the access control data designates the particular user, either by single-user identification code (user address), block-user address, designating a group of users, or master program address, designating all subscribers to receive the corresponding user pay-per-view code. For single-user program information, a prestored user ID code within nonvolatile memory 210 (FIG. 17) is compared to the user address contained within the access control data, in order to determine whether to store a corresponding user PPV code into a user PPV code register. For block-addressed program information, the higher-order bits of the prestored user identification code, rather than the entire ID code, are compared to the block address bits portion of the access control data, in order to determine whether to store the corresponding user pay-per-view code in one of the present subscriber's user pay-per-view code register. Registers 229 and 230 store the two most recently received and authorized user pay-per-view codes. As additional user pay-per-view codes are authorized to be stored, the least-recently written-to user pay-per-view code is overwritten with the newly-received code.

Program pay-per-view code register 228 stores the program pay-per-view code most recently received within the global data portion of the access control data, indicating the pay-per-view code corresponding to the television signal for the selected channel, presently being received. Magnitude comparator 232 compares the contents of program pay-per-view code register 228 with the contents of both user pay-per-view code registers 229 and 230. Multiplexer 231 allows each user pay-per-view code register to be sequentially compared to the contents of program pay-per-view code register 228. Output 233 of magnitude comparator 232, the pay-per-view authorization flag, indicates whether the contents of program pay-per-view code register 228 is equal to the contents of either user PPV code register. This, in turn, indicates whether a user is authorized to receive the present pay-per-view program.

The class authorization logic is shown in FIG. 20 as comprising user class code register 240, program class code register 241, and multiplexer 242. User class code register 240 is a 5-bit register containing a numeric value corresponding to the particular class in which the present subscriber is a member. This value has been previously downloaded into the particular subscriber's decoder apparatus, together with a user address, within the single-user program data within the access control data. Program class code register 241 stores the program class code for the present television signal being received on the selected channel, extracted from the global data portion of the access control data. Program class code register 241 is 32-bits wide, with each bit position corresponding to a particular class of user. A logic "1" within a bit position indicates that the corresponding class of users is authorized to receive the present program. A logic "0" within a particular bit position indicates that the corresponding class of users is not authorized to receive the present television programming. The output of program class register 241 is coupled to 32 data inputs of multiplexer 242. The output of user class register 240 is coupled to the 5 selector inputs of multiplexer 242. In this manner, the user class code register contents are employed to select the corresponding data bit within program class register 241 for the class in which the present subscriber is a member. A list of authorized classes for the present television program is thus compared to the class assigned to the present subscriber. Accordingly, output 243 of multiplexer 242 is a binary class authorization flag, indicating whether the present user is within a class of users authorized to receive the present programming.

Figure 21:
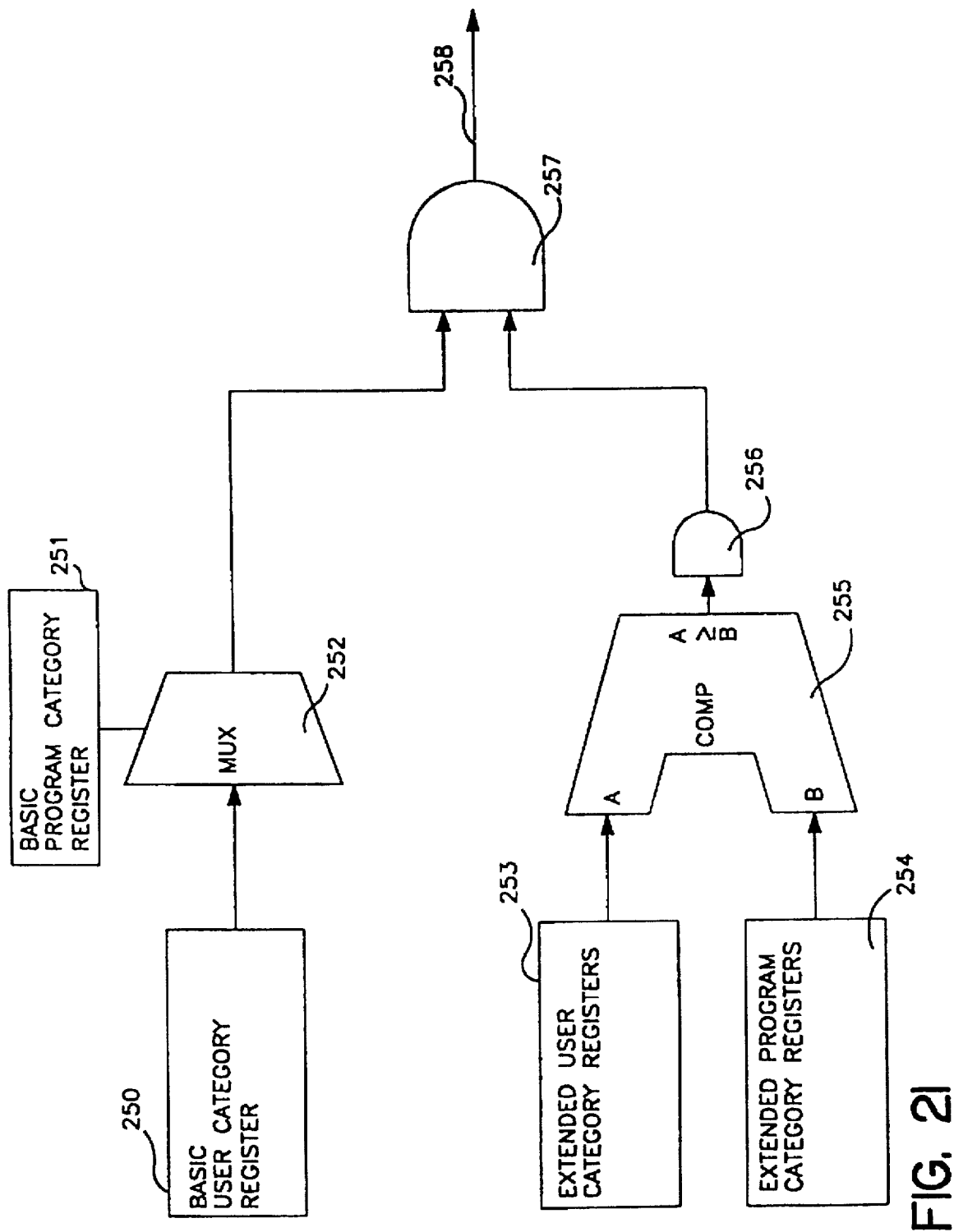
FIG. 21 of the drawings is a logic diagram of the category authorization process, showing, in particular, basic category authorization and extended category authorization.

The basic program category and extended program category authorization logic is shown in FIG. 21 as comprising basic user category register 250, basic program category register 251, extended user category registers 253, extended program category registers 254, magnitude comparators 255, AND gate 256, and AND gate 257. Basic user category register 250 is an 8-bit wide register, storing an 8-bit value previously addressed to the subscriber's decoder apparatus via the single user program data, block user program data, or master user program data portion of the access control data, together with appropriate block address and user address values. Each bit position within basic user category register 250 corresponds to a predetermined attribute of programming content. A logic "0" in any particular bit position indicates that the user has elected not to receive programming identified as containing content attributes within the particular category. Basic program category register 251 contains an 8-bit value, identifying the categories of programming content attributes (such as categories of potentially objectionable programming content attributes including violence and nudity) contained within the global data portion of the access control data for the present television program. The output of basic program category register 251 is coupled to the 8 selector input of multiplexer 252, while the output of basic user category register 250 is coupled to the 8 data inputs of multiplexer 252. In this manner, the value of basic program category register 251 selects an associated bit position within user category register 250 to be output by multiplexer 252. If this corresponding bit is set to a logic "1", the user has not previously expressed a desire to preclude viewing of programs containing content attributes within the corresponding program category. Accordingly, viewing of the program will not be precluded, and the viewer will be deemed to be authorized to receive the program. Conversely, if the corresponding bit is set to a logic "0", viewing of the presently selected television program will be precluded.

As shown in FIG. 21, the present decoder apparatus 200 further supports extended program category authorization, via extended user category registers 253 and extended program category registers 254. Extended user category registers 253 comprise 16 individual 4-bit registers. Each extended user category register 253 corresponds to a predetermined type of programming content attribute, such as violence or nudity. Moreover, each extended user category register 253 contains a 4-bit value, comprising a threshold level established by the individual subscriber, indicating a level or quantity of programming content attribute within the corresponding category, above which the subscriber does not wish to view programming. For each extended user category register 253, the user may program the register to any of a range of values from 0 to 15 via conventional on-screen menu-based programming, as explained above.

Extended program category registers 254 comprise sixteen 4-bit registers, similar to the extended user category registers 253. The extended program category registers 254 store the current program attribute level values received within the global data portion of the access control data for the television signal on the presently selected channel. For each of the 16 predetermined program categories, the current program level register stores a value indicative of a ranking of the current quantity or level of programming content for that particular attribute, or program category, contained within the television signal presently being received. Accordingly, for each of the 16 extended user category registers 253, there is a corresponding extended program category register 254. The output of each register 253 and 254, respectively, are fed into opposing inputs of one of sixteen corresponding magnitude comparators 255. Each magnitude comparator 255 compares the value stored within a corresponding extended user category register 253 and a corresponding extended program category register 254. The output of each comparator 255 is a binary flag indicative of whether the contents of an associated extended program category register is greater in magnitude than the contents of the corresponding associated extended user category register. If so, as indicated by a logic "0" output, the present television program contains a programming content attribute of a level or nature in excess of a predetermined threshold level previously established by the subscriber for a given program attribute. If not, as indicated by a logic "1" output, the programming content attribute for the present television program is not in excess of the threshold level previously established by the subscriber.

The output of each of the sixteen comparators 255 is fed into a corresponding input of sixteen-input AND gate 256. The output of AND gate 256 accordingly is a binary flag indicative of whether the contents of any of the extended program category registers 253 contains a value greater than the value contained within a corresponding extended user category register 254. AND gate 257 combines the outputs of multiplexer 252 and AND gate 256. Accordingly, program category authorization flag 258, output from AND gate 257, is a binary flag indicating whether the present user is authorized to receive the present program, given its assigned basic and extended category codes based upon its content attributes. Viewing of the present program will be precluded if either basic program category authorization (as determined by register 250, register 251, and multiplexer 252) or extended program category authorization (as determined by registers 253, registers 254, comparators 255, and AND gate 256) indicate that the subscriber wishes to preclude viewing of the present television program, given its content attributes.

The present decoder apparatus also supports an additional level of user access control, through the use of a conventional keycard security device. As shown in FIG. 17, decoder apparatus 20 includes card interface 211, coupled to microcontroller 206. Card interface 211 allows a conventional keycard to be physically inserted into decoder apparatus 200. The keycard comprises a conventional, off the shelf product including a microprocessor, non-volatile memory, and random access memory, and a bidirectional serial interface, integrated into a credit card-sized form factor. When inserted into card interface 211, data may be exchanged between microcontroller 206 and the keycard via the bidirectional serial interface.

In the preferred embodiment, the user is supplied with a keycard which is preprogrammed to operate as a signature analyzer. The keycard is programmed to receive a sequence of data values from microcontroller 206 via the serial data interface, sequentially process each data value via a conventional signature analysis algorithm employing a key value and a permutation table, and output a signature value, indicative of the received data values, back to microcontroller 206 via the serial data link.

As explained above, the global information embedded within the video information received by decoder apparatus 200 includes global data. Among the information contained within the global data are eight bytes of keycard input data, as well as one byte of keycard output data. As keycard input data values are received, they are buffered within registers and random access memory storage area 209. These buffered keycard input values are input to the keycard via card interface 211. An 8-bit return signature value, received by microcontroller 206 from the keycard, is compared by microcontroller 206 to the expected keycard output value, received within the global data portion of the access control data. If the two values are equal, keycard authorization is deemed successful. If not, the present decoder apparatus 200 is deemed to belong to an unauthorized user.

The logic for final user verification, combining the results of each of the previously-described pay-per-view authorization, keycard authorization, class authorization, and program category authorization, is shown in FIG. 22 as comprising AND gate 260, OR gate 264, program status register 261, multiplexer 262, and low pass filter 266. Program status register 261 contains a 2-bit program status code extracted from the global data portion of the access control data for the television program presently being viewed. The output of channel status register 261 provides an identification as to the type of program presently being viewed, and is coupled to the selector inputs of multiplexer 262. If the contents of program status register 261 is equal to 00, identifying a pay-per-view program, input 0 of multiplexer 262 is selected, passing the output of AND gate 260 through the multiplexer. AND gate 260 combines pay-per-view authorization flag 233, keycard authorization flag 259, class authorization flag 243, and program category authorization flag 258. If each authorization flag is enabled, viewing of the present pay-per-view program will be authorized.

If the contents of the program status register is equal to 01, indicating a promotional television program, a fixed logic "1" value, coupled to input number 1 of multiplexer 262, is selected and passed through the multiplexer. Accordingly, all users will be authorized to receive the promotional program, regardless of whether pay-per-view, keycard, class, and program category authorization are enabled.

If the contents of the program status register 261 is equal to 10, indicating a free power-on program, input number 2 to multiplexer 262 is selected, receiving the output of OR gate 264. OR gate 264 combines the authorization flags, having a combined output from AND gate 260, with power-on flag 263. If either power-on flag 263 is active, indicating that the user's controller unit has only recently been powered-on, or if the output of AND gate 260 indicates that the subscriber is authorized to receive the present programming, the output of OR gate 264 will be a logic high, authorizing receipt of the present programming. If the present subscriber is not authorized to receive the present programming via each of pay-per-view, class, category and keycard authorization, viewing of the present programming will be terminated after expiration of the power-on timer period, as power-on flag 263 transitions to an inactive state. In the preferred embodiment, the power-on time period, as indicated by power-on flag 263, is approximately five minutes in length.

If the contents of program status register 261 is equal to 11, indicating a free television program, input number 3 to multiplexer 262 is selected. This input is coupled to legal user flag 265, which is a binary flag indicating whether the contents of the user class register 240 (FIG. 20) is non-zero. If the contents of the user class register is equal to 0, no value has been downloaded into this register by the CATV service provider. The user of the present decoder apparatus is deemed to be an illegal user, and viewing of the free program channels will be precluded. If flag 265 indicates a non-zero content of user class register 240, viewing of the present free programming will be allowed.

Low pass filter 266 receives the output of multiplexer 262. It is anticipated that, for isolated video frames, portions of the access control data embedded within the video frames may be corrupted, such as by the injection of noise into the common antenna television distribution network. Invalid user address codes, pay-per-view codes, category codes, class codes, and keycard codes may be intermittently received due to such noise. During such times, multiplexer 262 may inaccurately indicate that the present user of decoder apparatus 200 is unauthorized to receive the present programming, when, in fact, the user is so authorized. Accordingly, a low pass filter, preferably of a length of approximately 16 video frames, is employed to filter out pulses from multiplexer 262 which are shorter than 16 frames. As a result, brief variations in the user authorization indication created by corrupted access control data which are shorter than 16 video frames in duration, will be filtered out and not passed through output 267 of low pass filter 266, and will not momentarily preclude viewing of the corresponding television programming.

Figure 18:
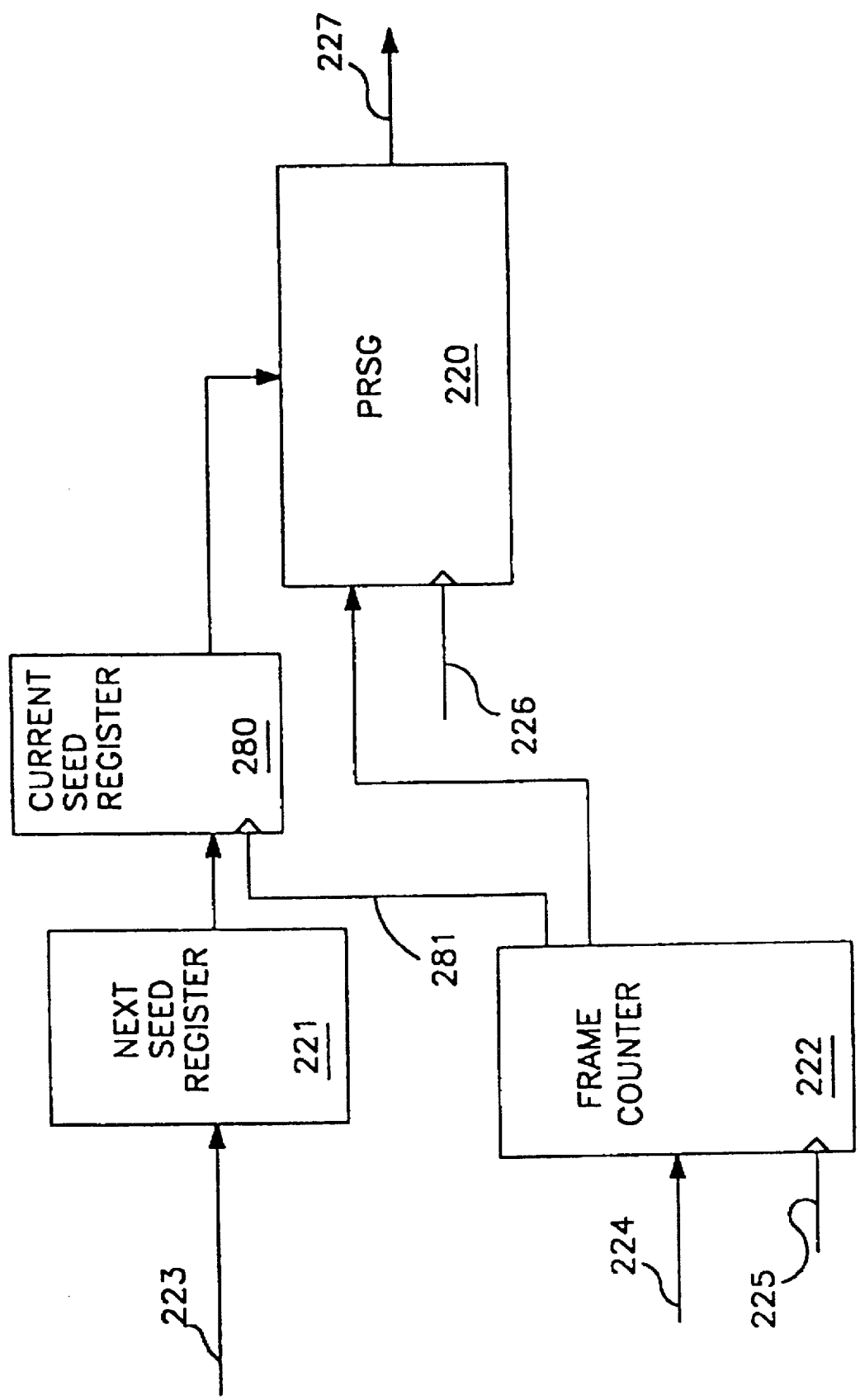
FIG. 18 of the drawings is a schematic diagram of a portion of the video/audio descrambler.

A portion of the video descrambling circuitry of video/audio descrambler 207 (FIG. 17) is shown in FIG. 18 as comprising next seed register 221, frame counter 222, current seed register 280, and programmable random signal generator PRSG 220. As explained above with respect to the global data contained within the access control data, the 8-bit video seed, employed by the programmable random signal generator within encoder apparatus 100, comprises a 4-bit next seed value component and a 4-bit frame count component. The video frames are logically subdivided into 16-frame groups. An 8-bit seed value is transmitted within each video frame. The 4-bit next seed value is constant for each frame within a group of frames of size N. In the preferred embodiment, a 16-frame group is used. The frame counter portion of the seed is incremented by the encoder apparatus from 0 to 15 for each sequential video frame within a 16 frame group. As each 8-bit video seed is received and decoded by data processing unit 205 (FIG. 17), the error detection and correction unit determines if the seed is valid or corrupted. If valid, the next seed component 223 is stored within next seed register 221, and the frame counter component 224 is parallel-loaded into frame counter 222. For each new video frame to be displayed by decoder apparatus 200, the 4-bit outputs of current seed register 280 and frame counter 222 are loaded into PRSG 220, via an 8-bit parallel input port.

For each new video frame, if uncorrectable data errors occur during transmission of the global data, it is possible that the data will not be available to load into next seed register 221 and frame counter 222. If the new video seed is unavailable due to such errors in the transmitted access control data, there is a potential for the seed stored within PRSG 220 to be unmatched, or out of synchronization, with the seed employed during the random line inversion video scrambling process within the encoder apparatus. This would result in the decoder apparatus being incapable of correctly descrambling video frames for a period of time. To overcome this problem, frame counter 222, storing the frame count component of the most recently received video seed, is incremented for each video frame by new frame control signal 225 whenever a valid 8-bit video seed is not received for a given video frame, as determined by the EDAC unit. If a valid 8-bit seed value is received, however, next seed register 221 and frame counter 222 are each loaded with corresponding components of the 8-bit seed value. For each new video frame, PRSG 220 is parallel loaded with the contents of current seed register 280 (for the four least significant bits), and with the current value of frame counter 222 (for the four most significant bits). When frame counter 222 reaches its maximum value of 15, as indicated by carry-out flag 281 of frame counter 222, the contents of next seed register 221 are transferred to current seed register 280.

In this manner, the contents of PRSG 220 can use a new seed value for each frame yet still remain in synchronization with the contents of the corresponding programmable random signal generator within the video scrambling unit of the encoder apparatus, regardless of whether isolated transmission errors occur, causing 8-bit video seed values within the global data to become unavailable in isolated video frames. So long as a valid next seed value can be received at any time during a sixteen frame group, the programmable random signal generators within the encoder and decoder apparatuses will remain in synchronization, using corresponding seeds and generating identical pseudo-random sequences of serial binary data.

The pseudo-random binary serial data sequence 227 output from programmable random signal generator 220, controls the position of an analog switch, designating whether the corresponding video line is to be inverted, or passed through non-inverted, employing similar buffers and switching circuitry to that shown in FIG. 3 for the video scrambling unit of the encoder apparatus. In this manner, those lines of each video frame which were randomly inverted by the encoder apparatus are now reinverted to normal video by the decoder apparatus.

The video signal will only be descrambled by the video descrambler if user access is authorized, as determined by the verification and authorization unit. The video signal output from video descrambler unit is coupled to a conventional character generator (OSD), which is controlled by the microcontroller. The OSD will be configured to a video bypass mode if the present subscriber is authorized to receive the presently-selected programming, as indicated by flag 258. If, however, the present subscriber is not authorized to receive the presently-selected programming, the OSD will be configured to produce a substantially blank screen, with a brief alphanumeric text message displayed indicating why viewing of the selected television program is presently precluded.

Although, in the illustrated embodiment, a cable television network is employed to distribute the video signals having embedded access control data, other distribution methods are also contemplated by the present invention. For example, each separate television channel may be broadcast to subscribers' homes using conventional VHF and UHF wireless transmitters. Alternatively, each subscriber may receive the television signals via a personal satellite dish pointed towards a geo-stationary satellite transmitter, which in turn receives the television signals having embedded access control data from either another satellite or from an earth-based uplink station.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. An apparatus for embedding viewer access control data within a television signal, said television signal including a sequence of television programs, said apparatus comprising:

means for generating a program category code identifying at least one attribute of program content of an associated television program;

means for changing said program category code during said associated television program; and means coupled to said television signal and said program category code generating means for inserting said program category code into said television signal, whereby an individual viewer may preclude receipt of portions of said television programming identified by a corresponding program category code as containing a program content attribute for which said individual viewer has chosen to preclude viewing.

2. The apparatus according to claim 1, wherein said at least one attribute comprises at least one attribute of a potentially offensive nature.

3. The apparatus according to claim 2, wherein said at least one attribute of a potentially offensive nature is selected from the group consisting of violence, nudity, and profanity.

4. The apparatus according to claim 1, wherein said at least one attribute comprises a plurality of attributes, said program category code identifying a plurality of attributes of program content of an associated television program.

5. An apparatus for embedding viewer access control data within a television signal, said television signal including a sequence of television programs, said apparatus comprising:

means for generating at least one extended program category code identifying a level of an attribute of program content within an associated television program, said level being variable over a predetermined range of potential values; and means coupled to said television signal and said extended program category code generating means for inserting said extended program category code into said television signal, whereby an individual viewer may preclude receipt of television programming identified by a corresponding extended program category code as containing a level of a program content attribute which is greater in magnitude than a threshold level for said attribute previously established by said individual viewer.

6. The apparatus according to claim 5, wherein said attribute comprises an attribute of a potentially offensive nature.

7. The apparatus according to claim 6, wherein said attribute of a potentially offensive nature is selected from the group consisting of violence, nudity and profanity.

8. The apparatus according to claim 5, wherein said at least one extended program category code comprises a plurality of extended program category codes, each of said extended program category codes identifying a level of a different attribute of program content contained within an associated television program.

9. An apparatus for embedding viewer access control data within a television signal, said television signal including a sequence of television programs, said apparatus comprising:
   means for generating a user identification code identifying a corresponding, single viewer;
   means for generating a user class code associating an individual viewer identified by said user identification code with at least one of a plurality of predetermined classes of viewers, each of said classes of viewers comprising a plurality of individual viewers;
   means for generating a program class code identifying particular classes of users authorized to view an associated television program; and
   means coupled to said television signal, user identification code generating means, user class code generating means, and program class code generating means for inserting each of said user identification code, user class code, and program class control code into said television signal,
   whereby a viewer identified by said user identification code is authorized to view a particular television program only when said particular television program contains a program class code which corresponds to said user class code.

10. The apparatus according to claim 9, wherein said at least one of said plurality of predetermined classes of viewers is selected from the group consisting of occupation, political party affiliation, and religion.

11. An apparatus for receiving a television signal containing embedded viewer access control data and for outputting said television signal to a video display, said embedded viewer access control data including a program category code identifying at least one attribute of program content of an associated television program, said apparatus comprising:
   means coupled to said television signal for extracting said program category code from said television signal;
   means for storing a user category code indicating at least one attribute of program content for which an individual user has elected to preclude receipt of television programming;
   means coupled to said extracting means and said storing means for comparing said program category code and said user category code; and
   means coupled to said comparing means for precluding output of a television signal to said video display when said television signal includes a program category code corresponding to said user category code.

12. The apparatus according to claim 11, wherein said at least one attribute comprises at least one attribute of a potentially offensive nature.

13. The apparatus according to claim 12, wherein said at least one attribute of a potentially offensive nature is selected from the group consisting of violence, nudity, and profanity.

14. The apparatus according to claim 11, wherein said at least one attribute comprises a plurality of attributes, said program category code identifying a plurality of attributes of program content of an associated television program.

15. An apparatus for receiving a television signal containing embedded viewer access control data and for outputting said television signal to a video display, said embedded viewer access control data including at least one extended program category code identifying a level of an attribute of program content within an associated television program, said level being variable over a predetermined range of potential values, said apparatus comprising:
   means coupled to said television signal for extracting said extended program category code from said television signal;
   means for establishing an extended user category code indicative of a threshold level of an associated attribute of program content, wherein an individual viewer has elected to preclude viewing of television programming having a level of program content of said associated attribute greater in magnitude than said threshold level;
   means coupled to said extracting means and said establishing means for comparing said extended program category code and said extended user category code; and
   means coupled to said comparing means for precluding output of a television signal to said video display when said extended program category code corresponding to said associated television program is greater in magnitude than said extended user category code.

16. The apparatus according to claim 15, wherein said attribute comprises an attribute of a potentially offensive nature.

17. The apparatus according to claim 16, wherein said attribute of a potentially offensive nature is selected from the group consisting of violence, nudity, and profanity.

18. The apparatus according to claim 15, wherein said at least one extended program category code comprises a plurality of extended program category codes, each of said extended program category codes identifying a level of a different attribute of program content within an associated television program.

19. An apparatus for receiving a television signal containing embedded viewer access control data and for outputting said television signal to a video display, said embedded viewer access control data including:
   a user identification code identifying a corresponding, single viewer;
   a user class code associating an individual viewer identified by said user identification code with at least one of a plurality of predetermined classes of viewers, each of said classes of viewers comprising a plurality of individual viewers; and
   a program class code identifying particular predetermined classes of users authorized to view an associated television program, said apparatus comprising:
      first storing means for storing a unique viewer address code uniquely identifying said apparatus;
      means coupled to said television signal for extracting said user identification code, user class code, and program class code from said television signal;
      first comparing means coupled to said first storing means and said extracting means for comparing said unique viewer address code and said user identification code;
      second storing means coupled to said extracting means and said first comparing means for storing said user class code when said unique viewer address code is equal to said user identification code;
      second comparing means coupled to said extracting means and said second storing means for comparing said program class code and said stored user class code; and means coupled to said second comparing means for precluding output of said television signal to said video display when said television signal includes a television program containing a program class code which does not correspond to said stored user class code.

20. The apparatus according to claim 19, wherein said at least one of said plurality of predetermined classes of viewers is selected from the group consisting of occupation, political party affiliation, and religion.

21. An apparatus for embedding viewer access control data within a television signal, said apparatus being capable of alternatively addressing a single receiving unit and a predetermined plurality of receiving units for receipt of said access control data, said apparatus comprising:

means for generating a user identification code uniquely identifying a single receiving unit;

means for generating a block address code identifying a predetermined subset of receiving units;

means for generating a block enable flag indicating whether said addressing is in one of a single user addressing mode and a block user addressing mode; and means coupled to said user identification code generating means, block address code generating means and block enable flag generating means for inserting said user identification code, block address code, and block enable flag into said television signal, whereby a single receiving unit is addressed when said block enable flag is indicative of said single user addressing mode and a predetermined plurality of receiving units are addressed when said block enable flag is indicative of said block user addressing mode.

22. A method for synchronizing a first pseudo-random number generator within a transmitting unit and a second pseudo-random number generator within a receiving unit, both of said first and second pseudo-random number generators being used in conjunction with a data set, said data set being logically divided into frames and frame sets of size N frames, said method comprising the steps of:

a) generating an initial seed value within said transmitting unit;

b) storing said initial seed value in a first current seed register within said transmitting unit, said first current seed register having a first current seed value;

c) generating a next seed value within said transmitting unit;

d) clearing a first frame counter within said transmitting unit, said first frame counter having a first frame count value;

e) loading said first current seed value and said first frame count value into said first pseudo-random number generator;

f) operating said pseudo-random number generator using said initial seed value and said first frame count value as a combined seed;

g) transmitting said next seed value and said first frame count value from said transmitting unit to said receiving unit;

h) incrementing said first frame counter;

i) repeating steps e through h when said first frame count value of said first frame counter is not equal to N;

j) storing said next seed value in said current seed register and repeating steps c through h when said first frame count value of said first frame counter is equal to N;

k) receiving said next seed value and said first frame count value within said receiving unit;

l) incrementing a second frame counter within said receiving unit at a beginning of a video frame;

m) testing whether said next seed value and said first frame count value received by said receiving unit are erroneous;

n) loading said next seed value into a next seed register within said receiving unit when said received next seed value is not erroneous;

o) loading said first frame count value into said second frame counter within said receiving unit when said received first frame count value is not erroneous, said second frame counter having a second frame count value;

p) loading a second current seed value from a second current seed register in said receiving unit and said second frame count value into said second pseudo-random number generator;

q) operating said second pseudo-random number generator using said second current seed value and said second frame count values as a combined seed;

r) clearing said frame counter and loading said second current seed register with a value output from said second next seed register when said second frame counter is equal to N; and s) repeating steps k through r.

23. The apparatus according to claim 1 wherein said program category code generating means further generates at least one extended program category code identifying a level of an attribute of program content within an associated television program, said level being variable over a predetermined range of potential values and said inserting means also inserts said at least one extended program category code into said television signal, whereby an individual viewer may further preclude receipt of television programming identified by a corresponding extended program category code as containing a level of said program content attribute which is greater in magnitude than a threshold level for said attribute previously established by said individual viewer.

24. The apparatus according to claim 23 further comprising:

means for generating a user identification code identifying a corresponding, single viewer;

means for generating a user class code associating an individual viewer identified by said user identification code with at least one of a plurality of predetermined classes of viewers, each of said classes of viewers comprising a plurality of individual viewers; and means for generating a program class code identifying particular classes of users authorized to view an associated television program;

said insertion means further inserting said user identification code, user class code, and program class code into said television signal, whereby a viewer identified by said user identification code is authorized to view a particular television program only when said particular television program contain a program class code which corresponds to said user class code as long as said corresponding program category code and extended program category code do not direct preclusion.

25. The apparatus according to claim 1 further comprising:

means for generating a user identification code identifying a corresponding, single viewer;

means for generating a user class code associating an individual viewer identified by said user identification code with at least one of a plurality of predetermined classes of viewers, each of said classes of viewers comprising a plurality of individual viewers; and means for generating a program class code identifying particular classes of users authorized to view an associated television program;

said insertion means further inserting said user identification code, user class code, and program class code into said television signal, whereby a viewer identified by said user identification code is authorized to view a particular television program only when said particular television program contain a program class code which corresponds to said user class code as long as said corresponding program category code does not direct preclusion.

26. The apparatus according to claim 5 further comprising:

means for generating a user identification code identifying a corresponding, single viewer;

means for generating a user class code associating an individual viewer identified by said user identification code with at least one of a plurality of predetermined classes of viewers, each of said classes of viewers comprising a plurality of individual viewers; and means for generating a program class code identifying particular classes of users authorized to view an associated television program;

said insertion means further inserting said user identification code, user class code, and program class code into said television signal, whereby a viewer identified by said user identification code is authorized to view a particular television program only when said particular television program contain a program class code which corresponds to said user class code as long as said corresponding extended program category code does not direct preclusion.

27. The apparatus according to claim 11 wherein said embedded viewer access control data further includes at least one extended program category code identifying a level of an attribute of program content within an associated television program, said level being variable over a predetermined range of potential values, said apparatus further comprising:

means for establishing an extended user category code indicative of a threshold level of an associated attribute of program content, wherein an individual viewer has elected to preclude viewing of television programming having a level of program content of said associated attribute greater in magnitude than said threshold level;

said extracting means further extracting said extended program category code from said television signal, said comparing means further coupled to said establishing means and for additionally comparing said extended program category code and said extended user category code, said output precluding means additionally precluding output of a television signal to said video display when said extended program category code corresponding to said associated television program is greater in magnitude than said extended user category code.

28. The apparatus according to claim 19 wherein said embedded viewer access control data further includes a program category code identifying at least one attribute of program content of said associated television program, wherein said extracting means further extracts said program category code from said television signal, said apparatus further comprising:

third storing means for storing a user category code indicating at least one attribute of program content for which an individual user has elected to preclude receipt of television programming;

third comparing means coupled to said extracting means for comparing said program category code and said user category code;

said output precluding means being further coupled to said third comparing means for additionally precluding output of said television signal to said video display when said television signal includes a program category code corresponding to said user category code.

29. The apparatus according to claim 28 wherein said embedded viewer access control data further includes at least one extended program category code identifying a level of an attribute of program content within said associated television program, said level being variable over a predetermined range wherein said extracting means further extracts said program category code from said television signal, said apparatus further comprising:

means for establishing an extended user category code indicative of a threshold level of an associated attribute of program content, wherein an individual viewer has elected to preclude viewing of television programming having a level of program content of said associated attribute greater in magnitude than said threshold level;

said third comparing means further being coupled to said establishing means for further comparing said extended program category code and said extended user category code;

said output precluding means for additionally precluding output of said television signal to said video display when said extended program category code corresponding to said television signal includes a program category code is greater in magnitude than said extended user category code.

30. The apparatus according to claim 19 wherein said embedded viewer access control data further includes at least one extended program category code identifying a level of an attribute of program content within said associated television program, said level being variable over a predetermined range wherein said extracting means further extracts said program category code from said television signal, said apparatus further comprising:

means for establishing an extended user category code indicative of a threshold level of an associated attribute of program content, wherein an individual viewer has elected to preclude viewing of television programming having a level of program content of said associated attribute greater in magnitude than said threshold level;

third comparing means coupled to said establishing means for comparing said extended program category code and said extended user category code;

said output precluding means being further coupled to said third comparing means for additionally precluding output of said television signal to said video display when said extended program category code corresponding to said television signal includes a program category code is greater in magnitude than said extended user category code.

* * * * *